United States Patent
Fahr et al.

(10) Patent No.: US 7,644,216 B2
(45) Date of Patent: Jan. 5, 2010

(54) SYSTEM AND METHOD FOR PROVIDING AN ADAPTER FOR RE-USE OF LEGACY DIMMS IN A FULLY BUFFERED MEMORY ENVIRONMENT

(75) Inventors: Gerald J. Fahr, Wappingers Falls, NY (US); Raymond J. Harrington, Staatsburg, NY (US); Roger A. Rippens, Salt Point, NY (US); Donald J. Swietek, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 11/735,677

(22) Filed: Apr. 16, 2007

(65) Prior Publication Data
US 2008/0256281 A1 Oct. 16, 2008

(51) Int. Cl. *H05K 7/10* (2006.01)
(52) U.S. Cl. .......... 710/301; 714/805; 365/63
(58) Field of Classification Search ......... 710/300–301, 710/313, 315; 365/51, 63; 714/805
See application file for complete search history.

(56) References Cited

U.S. PATENT DOCUMENTS

| | | | |
|---|---|---|---|
| 5,450,422 A * | 9/1995 | Dell | 714/773 |
| 5,513,135 A | 4/1996 | Dell et al. | |
| 6,173,382 B1 | 1/2001 | Dell et al. | |
| 6,457,155 B1 * | 9/2002 | Dell et al. | 714/773 |
| 6,510,100 B2 | 1/2003 | Grundon et al. | |
| 6,587,912 B2 | 7/2003 | Leddige et al. | |
| 2004/0205433 A1 | 10/2004 | Gower et al. | |
| 2006/0023482 A1 | 2/2006 | Dreps et al. | |
| 2006/0036827 A1 | 2/2006 | Dell et al. | |
| 2006/0107175 A1 | 5/2006 | Dell et al. | |
| 2006/0136618 A1 | 6/2006 | Gower et al. | |

\* cited by examiner

*Primary Examiner*—Clifford H Knoll
(74) *Attorney, Agent, or Firm*—Cantor Colburn LLP

(57) ABSTRACT

A system and method for providing an adapter for re-use of legacy DIMMS in a fully buffered memory environment. The system includes a memory adapter card having two rows of contacts along a leading edge of a length of the card. The rows of contacts are adapted to be inserted into a socket that is connected to a daisy chain high-speed memory bus via a packetized multi-transfer interface. The memory adapter card also includes a socket installed on the trailing edge of the card. In addition, the memory adapter card includes a hub device for converting the packetized multi-transfer interface into a parallel interface having timings and interface levels that are operable with a memory module having a parallel interface that is inserted into the socket. In addition, the hub device converts the packetized multi-transfer interface into a parallel interface having timings and interface levels that are operable with a memory module having a parallel interface that is inserted into the socket. The hub device also converts the parallel interface into the packetized multi-transfer interface.

20 Claims, 24 Drawing Sheets

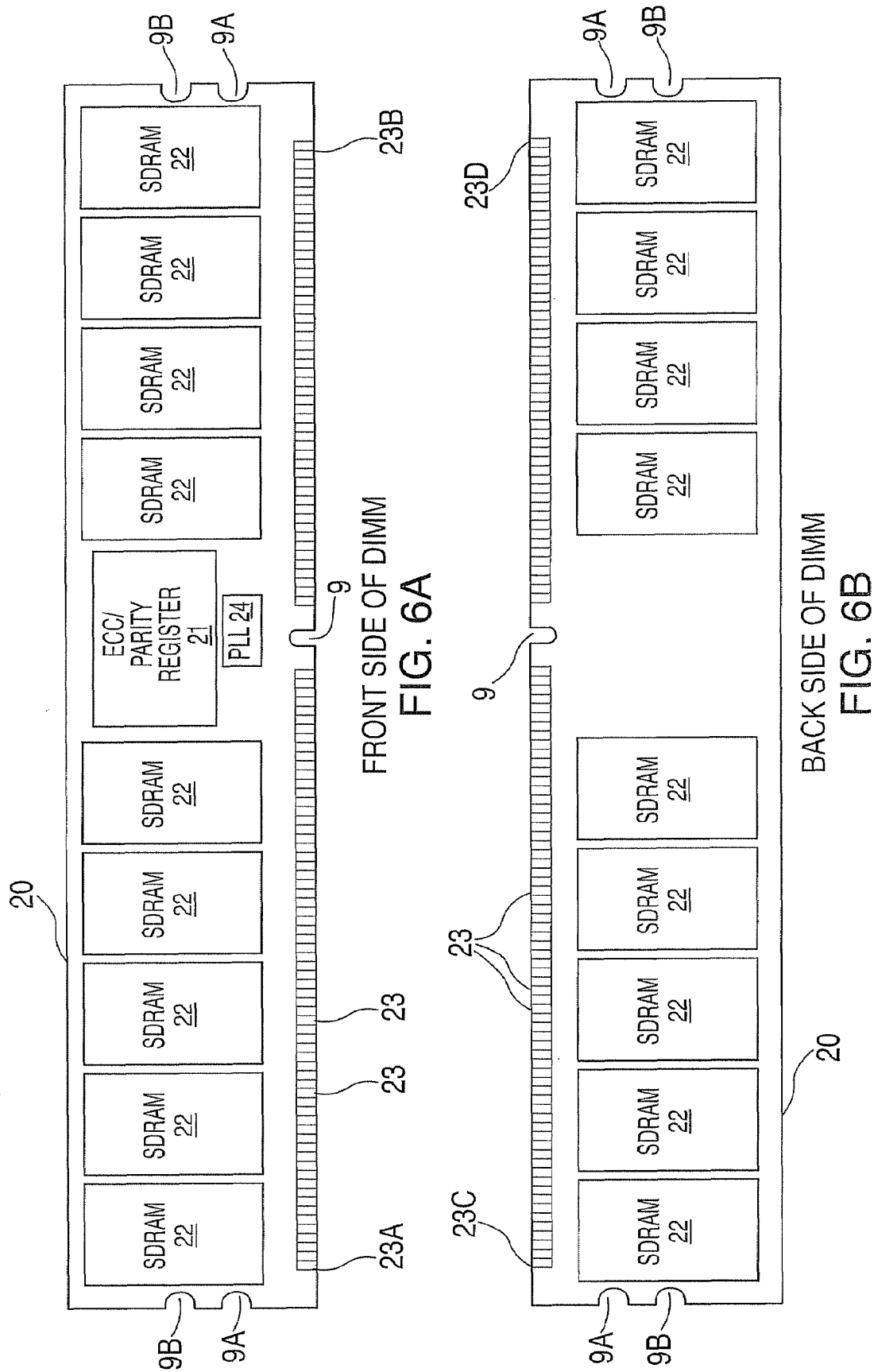

| SERVER DIMM PIN NUMBER | PIN NAME | SERVER DIMM PIN NUMBER | PIN NAME |
|---|---|---|---|
| 1 | Vref | 139 | Vref |
| 2 | SCL | 140 | SCL |
| 3 | SDA | 141 | SDA |
| 4 | UE | 142 | UE |
| 5 | CE | 143 | CE |
| 6 | VDD | 144 | VDD |
| 7 | ECCMODE | 145 | ECCMODE |
| 8 | DLY CKE/ODT | 146 | DLY CKE/ODT |
| 9 | CS GATE EN | 147 | CS GATE EN |
| 10 | GND | 148 | GND |
| 11 | DQ0 | 149 | DQ4 |
| 12 | DQ1 | 150 | DQ5 |
| 13 | GND | 151 | GND |
| 14 | DQS0* | 152 | DQS9 |
| 15 | DQS0 | 153 | DQS9* |
| 16 | GND | 154 | GND |
| 17 | DQ2 | 155 | DQ6 |
| 18 | DQ3 | 156 | DQ7 |
| 19 | GND | 157 | GND |
| 20 | VDD | 158 | VDD |
| 21 | GND | 159 | GND |
| 22 | DQ8 | 160 | DQ12 |
| 23 | DQ9 | 161 | DQ13 |
| 24 | GND | 162 | GND |
| 25 | DQS1* | 163 | DQS10 |
| 26 | DQS1 | 164 | DQS10* |
| 27 | GND | 165 | GND |
| 28 | DQ10 | 166 | DQ14 |
| 29 | DQ11 | 167 | DQ15 |
| 30 | GND | 168 | GND |
| 31 | DQ16 | 169 | DQ20 |
| 32 | DQ17 | 170 | DQ21 |
| 33 | GND | 171 | GND |
| 34 | DQS2* | 172 | DQS11 |
| 35 | DQS2 | 173 | DQS11* |
| 36 | GND | 174 | GND |
| 37 | DQ18 | 175 | DQ22 |
| 38 | DQ19 | 176 | DQ23 |
| 39 | GND | 177 | GND |
| 40 | RESET | 178 | RESET |
| 41 | VDD | 179 | VDD |
| 42 | GND | 180 | GND |
| 43 | DQ24 | 181 | DQ28 |
| 44 | DQ25 | 182 | DQ29 |
| 45 | GND | 183 | GND |
| 46 | DQS3* | 184 | DQS12 |
| 47 | DQS3 | 185 | DQS12* |
| 48 | GND | 186 | GND |
| 49 | DQ26 | 187 | DQ30 |
| 50 | DQ27 | 188 | DQ31 |
| 51 | GND | 189 | GND |
| 52 | CB0 | 190 | CB4 |

FIG. 8A

| | | | |
|---|---|---|---|
| 53 | CB1 | 191 | CB5 |
| 54 | GND | 192 | GND |
| 55 | DQS8* | 193 | DQS17 |
| 56 | DQS8 | 194 | DQS17* |
| 57 | GND | 195 | GND |
| 58 | CB2 | 196 | CB6 |
| 59 | CB3 | 197 | CB7 |
| 60 | GND | 198 | GND |
| 61 | VDD | 199 | VDD |
| 62 | CKE1 | 200 | CKE1 |
| 63 | CHKBT4 | 201 | CHKBT1 |
| 64 | CHKBT5 | 202 | CHKBT3 |
| 65 | CKE0 | 203 | CKE0 |
| 66 | VDD | 204 | VDD |
| 67 | A15 | 205 | A14 |
| 68 | BA2 | 206 | A12 |
| 69 | CHKBT0/PTY | 207 | A9 |
| 70 | A11 | 208 | CHKBT2 |
| 71 | VDD | 209 | VDD |
| 72 | A7 | 210 | A8 |
| 73 | A5 | 211 | A6 |
| 74 | A4 | 212 | A3 |
| 75 | A2 | 213 | A1 |
| 76 | VDD | 214 | VDD |
| 77 | CK0 | 215 | CK0 |
| 78 | CK0B | 216 | CK0B |
| 79 | VDD | 217 | VDD |
| 80 | GND | 218 | GND |
| 81 | VDD | 219 | VDD |
| 82 | A10 | 220 | A0 |
| 83 | BA0 | 221 | BA1 |
| 84 | WE | 222 | RAS |
| 85 | VDD | 223 | VDD |
| 86 | CS0 | 224 | CS0 |
| 87 | CAS | 225 | NC |
| 88 | ODT0 | 226 | ODT0 |
| 89 | NC | 227 | A13 |
| 90 | VDD | 228 | VDD |
| 91 | CS1 | 229 | CS1 |
| 92 | ODT1 | 230 | ODT1 |
| 93 | NC | 231 | TEST/NC |
| 94 | VDD | 232 | VDD |
| 95 | GND | 233 | GND |
| 96 | DQ32 | 234 | DQ36 |
| 97 | DQ33 | 235 | DQ37 |
| 98 | GND | 236 | GND |
| 99 | DQS4* | 237 | DQS13 |
| 100 | DQS4 | 238 | DQS13* |
| 101 | GND | 239 | GND |
| 102 | DQ34 | 240 | DQ38 |

FIG. 8B

| | | | |
|---|---|---|---|
| 103 | DQ35 | 241 | DQ39 |
| 104 | GND | 242 | GND |
| 105 | DQ40 | 243 | DQ44 |
| 106 | DQ41 | 244 | DQ45 |
| 107 | GND | 245 | GND |
| 108 | DQS5* | 246 | DQS14 |
| 109 | DQS5 | 247 | DQS14* |
| 110 | GND | 248 | GND |
| 111 | DQ42 | 249 | DQ46 |
| 112 | DQ43 | 250 | DQ47 |
| 113 | GND | 251 | GND |
| 114 | DQ48 | 252 | DQ52 |
| 115 | DQ49 | 253 | DQ53 |
| 116 | GND | 254 | GND |
| 117 | DQS6* | 255 | DQS15 |
| 118 | DQS6 | 256 | DQS15* |
| 119 | GND | 257 | GND |
| 120 | DQ50 | 258 | DQ54 |
| 121 | DQ51 | 259 | DQ55 |
| 122 | GND | 260 | GND |
| 123 | DQ56 | 261 | DQ60 |
| 124 | DQ57 | 262 | DQ61 |
| 125 | GND | 263 | GND |
| 126 | DQS7* | 264 | DQS16 |
| 127 | DQS7 | 265 | DQS16* |
| 128 | GND | 266 | GND |
| 129 | DQ58 | 267 | DQ62 |
| 130 | DQ59 | 268 | DQ63 |
| 131 | GND | 269 | GND |
| 132 | VDD | 270 | VDD |
| 133 | SA2 | 271 | SA2 |
| 134 | VDDSPD | 272 | VDDSPD |
| 135 | SDA | 273 | SDA |
| 136 | SCL | 274 | SCL |
| 137 | SA0 | 275 | SA0 |
| 138 | SA1 | 276 | SA1 |

FIG. 8C

| DOWNSTREAM | | | | | | | | | | | | | | | | | | | | | | FORMAT: 9 DATA – 8 CMD – 4 ECC – 1 SPARE – 1 DIFF CLK = 24 WIRES |
|---|---|---|---|---|---|---|---|---|---|---|---|---|---|---|---|---|---|---|---|---|---|---|
| s3_us(#) d3_s3(#) | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
| Xfer/Bit | SPARE | ECC0 | ECC1 | ECC2 | ECC3 | DI0 | DI1 | DI2 | DI3 | DI4 | DI5 | DI6 | DI7 | DI8 | C0 | C1 | C2 | C3 | C4 | C5 | C6 | C7 |
| 0 | S0 | E00 | E10 | E20 | E30 | D00 | D10 | D20 | D30 | D40 | D50 | D60 | D70 | D80 | C00 | C10 | C20 | C30 | C40 | C50 | C60 | C70 |
| 1 | S1 | E01 | E11 | E21 | E31 | D01 | D11 | D21 | D31 | D41 | D51 | D61 | D71 | D81 | C01 | C11 | C21 | C31 | C41 | C51 | C61 | C71 |
| 2 | S2 | E02 | E12 | E22 | E32 | D02 | D12 | D22 | D32 | D42 | D52 | D62 | D72 | D82 | C02 | C12 | C22 | C32 | C42 | C52 | C62 | C72 |
| 3 | S3 | E03 | E13 | E23 | E33 | D03 | D13 | D23 | D33 | D43 | D53 | D63 | D73 | D83 | C03 | C13 | C23 | C33 | C43 | C53 | C63 | C73 |
| 4 | S4 | E04 | E14 | E24 | E34 | D04 | D14 | D24 | D34 | D44 | D54 | D64 | D74 | D84 | C04 | C14 | C24 | C34 | C44 | C54 | C64 | C74 |
| 5 | S5 | E05 | E15 | E25 | E35 | D05 | D15 | D25 | D35 | D45 | D55 | D65 | D75 | D85 | C05 | C15 | C25 | C35 | C45 | C55 | C65 | C75 |
| 6 | S6 | E06 | E16 | E26 | E36 | D06 | D16 | D26 | D36 | D46 | D56 | D66 | D76 | D86 | C06 | C16 | C26 | C36 | C46 | C56 | C66 | C66 |
| 7 | S7 | E07 | E17 | E27 | E37 | D07 | D17 | D27 | D37 | D47 | D57 | D67 | D77 | D87 | C07 | C17 | C27 | C37 | C47 | C57 | C67 | C67 |

SPARE BITS 1302

E: ECC CHECK BITS 1304

D: WRITE DATA BITS 1306

C: COMMAND BITS 1308

FIG. 12

276 P: Buffered DIMM Pin Assignments

| TOP Pin Number | BOTTOM Pin Number | TOP Pin Function | BOTTOM Pin Function | Distance From Center Notch (or Key) left or right of notch |
|---|---|---|---|---|
| 1 | 139 | Continuity(0) | GND | 81.5 Distance To left of notch (front view) |
| 2 | 140 | VTT | VTT | 80.5 |
| 3 | 141 | scope_trigger(0) | scope_trigger(1) | 79.5 |
| 4 | 142 | serv_ifc(1) | serv_ifc(1)_r | 78.5 |
| 5 | 143 | serv_ifc(2) | serv_ifc(2)_r | 77.5 |
| 6 | 144 | rtu0 | rtu0_r | 76.5 |
| 7 | 145 | rtu1 | rtu1_r | 75.5 |
| 8 | 146 | GND | GND | 74.5 |
| 9 | 147 | 1.8V | 1.8V | 73.5 |
| 10 | 148 | us_s3(0) | s3_ds(0) | 72.5 |
| 11 | 149 | us_s3(1) | s3_ds(1) | 71.5 |
| 12 | 150 | GND | GND | 70.5 |
| 13 | 151 | 1.8V | 1.8V | 69.5 |
| 14 | 152 | us_s3(2) | s3_ds(2) | 68.5 |
| 15 | 153 | us_s3(3) | s3_ds(3) | 67.5 |
| 16 | 154 | GND | GND | 66.5 |
| 17 | 155 | 1.8V | 1.8V | 65.5 |
| 18 | 156 | us_s3(4) | s3_ds(4) | 64.5 |
| 19 | 157 | us_s3(5) | s3_ds(5) | 63.5 |
| 20 | 158 | GND | GND | 62.5 |
| 21 | 159 | 1.8V | 1.8V | 61.5 |
| 22 | 160 | us_s3(6) | s3_ds(6) | 60.5 |
| 23 | 161 | us_s3(7) | s3_ds(7) | 59.5 |
| 24 | 162 | GND | GND | 58.5 |
| 25 | 163 | 1.8V | 1.8V | 57.5 |
| 26 | 164 | us_s3(8) | s3_ds(8) | 56.5 |
| 27 | 165 | us_s3(9) | s3_ds(9) | 55.5 |
| 28 | 166 | GND | GND | 54.5 |
| 29 | 167 | 1.8V | 1.8V | 53.5 |
| 30 | 168 | us_s3(10) | s3_ds(10) | 52.5 |
| 31 | 169 | us_s3(11) | s3_ds(11) | 51.5 |
| 32 | 170 | GND | GND | 50.5 |
| 33 | 171 | 1.8V | 1.8V | 49.5 |
| 34 | 172 | s3_us(0) | ds_s3(0) | 48.5 |
| 35 | 173 | s3_us(1) | ds_s3(1) | 47.5 |
| 36 | 174 | GND | GND | 46.5 |
| 37 | 175 | 1.8V | 1.8V | 45.5 |
| 38 | 176 | s3_us(2) | ds_s3(2) | 44.5 |
| 39 | 177 | s3_us(3) | ds_s3(3) | 43.5 |
| 40 | 178 | GND | GND | 42.5 |
| 41 | 179 | 1.8V | 1.8V | 41.5 |
| 42 | 180 | s3_us(4) | ds_s3(4) | 40.5 |
| 43 | 181 | s3_us(5) | ds_s3(5) | 39.5 |
| 44 | 182 | GND | GND | 38.5 |
| 45 | 183 | 1.8V | 1.8V | 37.5 |
| 46 | 184 | s3_us_clk_n | s3_us_clk_n_r | 36.5 |
| 47 | 185 | s3_us_clk_p | s3_us_clk_p_r | 35.5 |
| 48 | 186 | us_s3_clk_n | us_s3_clk_n_r | 34.5 |
| 49 | 187 | us_s3_clk_p | us_s3_clk_p_r | 33.5 |
| 50 | 188 | 1.8V | 1.8V | 32.5 |
| 51 | 189 | GND | GND | 31.5 |
| 52 | 190 | s3_us(6) | ds_s3(6) | 30.5 |
| 53 | 191 | s3_us(7) | ds_s3(7) | 29.5 |
| 54 | 192 | 1.2V | 1.2V | 28.5 |
| 55 | 193 | GND | GND | 27.5 |
| 56 | 194 | s3_us(8) | ds_s3(8) | 26.5 |
| 57 | 195 | s3_us(9) | ds_s3(9) | 25.5 |
| 58 | 196 | 1.2V | 1.2V | 24.5 |
| 59 | 197 | GND | GND | 23.5 |
| 60 | 198 | serv_ifc(3) | serv_ifc(4) | 22.5 |
| 61 | 199 | serv_ifc(5) | serv_ifc(5)_r | 21.5 |
| 62 | 200 | serv_ifc(6) | serv_ifc(7) | 20.5 |
| 63 | 201 | serv_ifc(8) | serv_ifc(8)_r | 19.5 |
| 64 | 202 | 1.2V | 1.2V | 18.5 |
| 65 | 203 | SA0 | SA0_r | 17.5 |
| 66 | 204 | SA1 | SA1_r | 16.5 |
| 67 | 205 | SA2 | SA2_r | 15.5 |

| 13a |
|---|
| 13b |

| | | | | | |
|---|---|---|---|---|---|
| 68 | 206 | vddstby(0) | vddstby(1) | 14.5 | |
| 69 | 207 | PLL_VDDA | PLL_VDDA | 13.5 | |
| 70 | 208 | VDDSPD | VDDSPD | 12.5 | |
| 71 | 209 | serv_ifc(9) | serv_ifc(10) | 11.5 | |
| 72 | 210 | serv_ifc(11) | serv_ifc(11)_r | 10.5 | |
| 73 | 211 | serv_ifc(12) | serv_ifc(12)_r | 9.5 | |
| 74 | 212 | serv_ifc(13) | serv_ifc(14) | 8.5 | |
| 75 | 213 | 1.2V | 1.2V | 7.5 | |
| 76 | 214 | GND | GND | 6.5 | |
| 77 | 215 | power_rst | power_rst_r | 5.5 | |
| 78 | 216 | s3_us(10) | ds_s3(10) | 4.5 | |
| 79 | 217 | 1.2V | 1.2V | 3.5 | |
| 80 | 218 | GND | GND | 2.5 | Distance To left of notch (front view) |
| Notch | Notch | | | | |
| 81 | 219 | s3_us(11) | ds_s3(11) | 2.5 | Distance To right of notch (front view) |
| 82 | 220 | s3_us(12) | ds_s3(12) | 3.5 | |
| 83 | 221 | 1.2V | 1.2V | 4.5 | |
| 84 | 222 | GND | GND | 5.5 | |
| 85 | 223 | s3_us(13) | ds_s3(13) | 6.5 | |
| 86 | 224 | s3_us(14) | ds_s3(14) | 7.5 | |
| 87 | 225 | 1.8V | 1.8V | 8.5 | |
| 88 | 226 | GND | GND | 9.5 | |
| 89 | 227 | s3_us(15) | ds_s3(15) | 10.5 | |
| 90 | 228 | s3_us(16) | ds_s3(16) | 11.5 | |
| 91 | 229 | GND | GND | 12.5 | |
| 92 | 230 | 1.8V | 1.8V | 13.5 | |
| 93 | 231 | s3_us(17) | ds_s3(17) | 14.5 | |
| 94 | 232 | s3_us(18) | ds_s3(18) | 15.5 | |
| 95 | 233 | GND | GND | 16.5 | |
| 96 | 234 | 1.8V | 1.8V | 17.5 | |
| 97 | 235 | s3_us(19) | ds_s3(19) | 18.5 | |
| 98 | 236 | s3_us(20) | ds_s3(20) | 19.5 | |
| 99 | 237 | GND | GND | 20.5 | |
| 100 | 238 | 1.8V | 1.8V | 21.5 | |
| 101 | 239 | s3_us(21) | ds_s3(21) | 22.5 | |
| 102 | 240 | s3_us(22) | ds_s3(22) | 23.5 | |
| 103 | 241 | GND | GND | 24.5 | |
| 104 | 242 | 1.8V | 1.8V | 25.5 | |
| 105 | 243 | us_s3(12) | s3_ds(12) | 26.5 | |
| 106 | 244 | us_s3(13) | s3_ds(13) | 27.5 | |
| 107 | 245 | GND | GND | 28.5 | |
| 108 | 246 | 1.8V | 1.8V | 29.5 | |
| 109 | 247 | us_s3(14) | s3_ds(14) | 30.5 | |
| 110 | 248 | us_s3(15) | s3_ds(15) | 31.5 | |
| 111 | 249 | GND | GND | 32.5 | |
| 112 | 250 | 1.8V | 1.8V | 33.5 | |
| 113 | 251 | us_s3_clk_n | us_s3_clk_n_r | 34.5 | |
| 114 | 252 | us_s3_clk_p | us_s3_clk_p_r | 35.5 | |
| 115 | 253 | s3_ds_clk_n | s3_ds_clk_n_r | 36.6 | |
| 116 | 254 | s3_ds_clk_p | s3_ds_clk_p_r | 37.5 | |
| 117 | 255 | GND | GND | 38.5 | |
| 118 | 256 | 1.8V | 1.8V | 39.5 | |
| 119 | 257 | us_s3(16) | s3_ds(16) | 40.5 | |
| 120 | 258 | us_s3(17) | s3_ds(17) | 41.5 | |
| 121 | 259 | GND | GND | 42.5 | |
| 122 | 260 | 1.8V | 1.8V | 43.5 | |
| 123 | 261 | us_s3(18) | s3_ds(18) | 44.5 | |
| 124 | 262 | us_s3(19) | s3_ds(19) | 45.5 | |
| 125 | 263 | GND | GND | 46.5 | |
| 126 | 264 | 1.8V | 1.8V | 47.5 | |
| 127 | 265 | us_s3(20) | s3_ds(20) | 48.5 | |
| 128 | 266 | us_s3(21) | s3_ds(21) | 49.5 | |
| 129 | 267 | GND | GND | 50.5 | |
| 130 | 268 | 1.8V | 1.8V | 51.5 | |
| 131 | 269 | rfu2 | rfu2_r | 52.5 | |
| 132 | 270 | power_sns | power_sns_r | 53.5 | |
| 133 | 271 | serv_ifc(15) | serv_ifc(15)_r | 54.5 | |
| 134 | 272 | i2c_scl | i2c_scl_r | 55.5 | |
| 135 | 273 | i2c_sda | i2c_sda_r | 56.5 | |
| 136 | 274 | serv_ifc(16) | serv_ifc(17) | 57.5 | |
| 137 | 275 | VTT | VTT | 58.5 | |
| 138 | 276 | Continutity(1) | 1.8V | 59.5 | Distance To right of notch (front view) |

FIG. 13b

| TOP Pin Number | BOTTOM Pin Number | TOP Pin Function | BOTTOM Pin Function | Distance From Center Notch (or Key) left or right of notch |
|---|---|---|---|---|
| 1 | 139 | 1.8V | 1.8V | 81.5 Distance To left of notch (front view) |
| 2 | 140 | vref_test | 1.8V | 80.5 |
| 3 | 141 | scope trigger(0) | scope trigger(1) | 79.5 |
| 4 | 142 | fault_n | fault_n_r | 78.5 |
| 5 | 143 | 1.8V | 1.2V | 77.5 |
| 6 | 144 | 1.2V | s3_ds(0) | 76.5 |
| 7 | 145 | us_s3(0) | GND | 75.5 |
| 8 | 146 | GND | s3_ds(1) | 74.5 |
| 9 | 147 | us_s3(1) | 1.2V | 73.5 |
| 10 | 148 | 1.2V | s3_ds(2) | 72.5 |
| 11 | 149 | us_s3(2) | GND | 71.5 |
| 12 | 150 | GND | s3_ds(3) | 70.5 |
| 13 | 151 | us_s3(3) | 1.2V | 69.5 |
| 14 | 152 | 1.2V | s3_ds(4) | 68.5 |
| 15 | 153 | us_s3(4) | GND | 67.5 |
| 16 | 154 | GND | s3_ds(5) | 66.5 |
| 17 | 155 | us_s3(5) | 1.2V | 65.5 |
| 18 | 156 | 1.2V | s3_ds(6) | 64.5 |
| 19 | 157 | us_s3(6) | GND | 63.5 |
| 20 | 158 | GND | 1.8V | 62.5 |
| 21 | 159 | 1.8V | 1.8V | 61.5 |
| 22 | 160 | 1.8V | 1.8V | 60.5 |
| 23 | 161 | 1.8V | GND | 59.5 |
| 24 | 162 | GND | s3_ds(7) | 58.5 |
| 25 | 163 | us_s3(7) | 1.2V | 57.5 |
| 26 | 164 | 1.2V | GND | 56.5 |
| 27 | 165 | us_s3(8) | s3_ds(8) | 55.5 |
| 28 | 166 | GND | s3_ds(9) | 54.5 |
| 29 | 167 | us_s3(9) | 1.2V | 53.5 |
| 30 | 168 | 1.2V | s3_ds(10) | 52.5 |
| 31 | 169 | us_s3(10) | GND | 51.5 |
| 32 | 170 | GND | s3_ds(11) | 50.5 |
| 33 | 171 | us_s3(11) | 1.2V | 49.5 |
| 34 | 172 | 1.2V | s3_ds(12) | 48.5 |
| 35 | 173 | us_s3(12) | GND | 47.5 |
| 36 | 174 | GND | s3_ds(13) | 46.5 |
| 37 | 175 | us_s3(13) | 1.2V | 45.5 |
| 38 | 176 | 1.2V | s3_ds(14) | 44.5 |
| 39 | 177 | us_s3(14) | GND | 43.5 |
| 40 | 178 | GND | s3_ds(15) | 42.5 |
| 41 | 179 | us_s3(15) | 1.2V | 41.5 |
| 42 | 180 | 1.2V | s3_ds(16) | 40.5 |
| 43 | 181 | us_s3(16) | GND | 39.5 |
| 44 | 182 | GND | s3_ds(17) | 38.5 |
| 45 | 183 | us_s3(17) | 1.2V | 37.5 |
| 46 | 184 | 1.2V | us_s3_clk_n_r | 36.5 |
| 47 | 185 | us_s3_clk_n | us_s3_clk_p_r | 35.5 |
| 48 | 186 | us_s3_clk_p | 1.8V | 34.5 |
| 49 | 187 | 1.8V | s3_ds_clk_n_r | 33.5 |
| 50 | 188 | s3_ds_clk_n | s3_ds_clk_p_r | 32.5 |
| 51 | 189 | s3_ds_clk_p | GND | 31.5 |
| 52 | 190 | GND | s3_ds(18) | 30.5 |
| 53 | 191 | us_s3(18) | 1.2V | 29.5 |
| 54 | 192 | 1.2V | s3_ds_(19) | 28.5 |

| 14a |
|---|
| 14b |
| 14c |

| | | | | |
|---|---|---|---|---|
| 55 | 193 | us_s3(19) | GND | 27.5 |
| 56 | 194 | GND | s3_ds(20) | 26.5 |
| 57 | 195 | us_s3(20) | 1.2V | 25.5 |
| 58 | 196 | 1.2V | s3_ds(21) | 24.5 |
| 59 | 197 | us_s3(21) | GND | 23.5 |
| 60 | 198 | GND | 1.8V | 22.5 |
| 61 | 199 | fsi0_data | fsi0_data_r | 21.5 |
| 62 | 200 | fsi1_data | fsi1_data_r | 20.5 |
| 63 | 201 | 1.8V | GND | 19.5 |
| 64 | 202 | fsi1_clk | fsi1_clk_r | 18.5 |
| 65 | 203 | fsi0_clk | fsi0_clk_r | 17.5 |
| 66 | 204 | SA0 | SA0_r | 16.5 |
| 67 | 205 | vddstby | vddstby | 15.5 |
| 68 | 206 | PLL_VDDA | PLL_VDDA | 14.5 |
| 69 | 207 | VDDSPD | VDDSPD | 13.5 |
| 70 | 208 | 1.8V | 1.8V | 12.5 |
| 71 | 209 | next_fsi1_data | next_fsi1_data_r | 11.5 |
| 72 | 210 | next_fsi1_clk | next_fsi1_clk_r | 10.5 |
| 73 | 211 | GND | 1.2V | 9.5 |
| 74 | 212 | next_fsi0_data | next_fsi0_data_r | 8.5 |
| 75 | 213 | next_fsi0_clk | next_fsi0_clk_r | 7.5 |
| 76 | 214 | cfam_reset_b | cfam_reset_b_r | 6.5 |
| 77 | 215 | 1.8V | GND | 5.5 |
| 78 | 216 | GND | ds_s3(0) | 4.5 |
| 79 | 217 | s3_us(0) | 1.2V | 3.5 |
| 80 | 218 | 1.2V | ds_s3(1) | 2.5 Distance To left of notch (front view) |
| Notch | Notch | | | |
| 81 | 219 | s3_us(1) | GND | 2.5 Distance To right of notch (front view) |
| 82 | 220 | GND | ds_s3(2) | 3.5 |
| 83 | 221 | s3_us(2) | 1.2V | 4.5 |
| 84 | 222 | 1.2V | s3_us_clk_n_r | 5.5 |
| 85 | 223 | s3_us_clk_n | s3_us_clk_p_r | 6.5 |
| 86 | 224 | s3_us_clk_p | 1.8V | 7.5 |
| 87 | 225 | 1.8V | ds_s3_clk_n_r | 8.5 |
| 88 | 226 | ds_s3_clk_n | ds_s3_clk_p_r | 9.5 |
| 89 | 227 | ds_s3_clk_p | GND | 10.5 |
| 90 | 228 | GND | ds_s3(3) | 11.5 |
| 91 | 229 | s3_us(3) | 1.2V | 12.5 |
| 92 | 230 | 1.2V | ds_s3(4) | 13.5 |
| 93 | 231 | s3_us(4) | GND | 14.5 |
| 94 | 232 | GND | ds_s3(5) | 15.5 |
| 95 | 233 | s3_us(5) | 1.2V | 16.5 |
| 96 | 234 | 1.2V | ds_s3(6) | 17.5 |
| 97 | 235 | s3_us(6) | GND | 18.5 |
| 98 | 236 | GND | ds_s3(7) | 19.5 |
| 99 | 237 | s3_us(7) | 1.2V | 20.5 |
| 100 | 238 | 1.2V | ds_s3(8) | 21.5 |
| 101 | 239 | s3_us(8) | GND | 22.5 |
| 102 | 240 | GND | ds_s3(9) | 23.5 |
| 103 | 241 | s3_us_(9) | 1.2V | 24.5 |
| 104 | 242 | 1.2V | ds_s3(10) | 25.5 |
| 105 | 243 | s3_us(10) | GND | 26.5 |
| 106 | 244 | GND | ds_s3(11) | 27.5 |

FIG. 14b

| | | | | |
|---|---|---|---|---|
| 107 | 245 | s3_us(11) | 1.2V | 28.5 |
| 108 | 246 | 1.2V | ds_s3(12) | 29.5 |
| 109 | 247 | s3_us(12) | GND | 30.5 |
| 110 | 248 | GND | ds_s3(13) | 31.5 |
| 111 | 249 | s3_us(13) | 1.2V | 32.5 |
| 110 | 250 | 1.2V | 1.8V | 33.5 |
| 113 | 251 | 1.8V | 1.8V | 34.5 |
| 114 | 252 | 1.8V | 1.8V | 35.5 |
| 115 | 253 | 1.8V | GND | 36.6 |
| 116 | 254 | GND | ds_s3(14) | 37.5 |
| 117 | 255 | s3_us(14) | 1.2V | 38.5 |
| 118 | 256 | 1.2V | ds_s3(15) | 39.5 |
| 116 | 257 | s3_us(15) | GND | 40.5 |
| 120 | 258 | GND | ds_s3(16) | 41.5 |
| 121 | 259 | s3_us(16) | 1.2V | 42.5 |
| 122 | 260 | 1.2V | ds_s3(17) | 43.5 |
| 123 | 261 | s3_us(17) | GND | 44.5 |
| 124 | 262 | GND | ds_s3(18) | 45.5 |
| 125 | 263 | s3_us(18) | 1.2V | 46.5 |
| 126 | 264 | 1.2V | ds_s3(19) | 47.5 |
| 127 | 265 | s3_us(19) | GND | 48.5 |
| 128 | 266 | GND | ds_s3(20) | 49.5 |
| 129 | 267 | s3_us(20) | 1.2V | 50.5 |
| 130 | 268 | 1.2V | ds_s3(21) | 51.5 |
| 131 | 269 | s3_us(21) | GND | 52.5 |
| 132 | 270 | GND | ds_s3(22) | 53.5 |
| 133 | 271 | s3_us(22) | 1.2V | 54.5 |
| 134 | 272 | 1.2V | 1.8V | 55.5 |
| 135 | 273 | scl | scl_r | 56.5 |
| 136 | 274 | sda | sda_r | 57.5 |
| 137 | 275 | fsi_sel_b | fsi_sel_b_r | 58.5 |
| 138 | 276 | 1.8V | 1.8V | 59.5 Distance To right of notch (front view) |

FIG. 14c

SYSTEM AND METHOD FOR PROVIDING AN ADAPTER FOR RE-USE OF LEGACY DIMMS IN A FULLY BUFFERED MEMORY ENVIRONMENT

BACKGROUND OF THE INVENTION

This invention relates generally to computer memory, and more particularly to providing an adapter for re-use of legacy dual in-line memory modules (DIMMS) in a fully buffered memory environment.

Contemporary high performance computing main memory systems are generally composed of one or more dynamic random access memory (DRAM) devices, which are connected to one or more processors via one or more memory control elements. Overall computer system performance is affected by each of the key elements of the computer structure, including the performance/structure of the processor(s), any memory cache(s), the input/output (I/O) subsystem(s), the efficiency of the memory control function(s), the main memory device(s), and the type and structure of the memory interconnect interface(s).

Extensive research and development efforts are invested by the industry, on an ongoing basis, to create improved and/or innovative solutions to maximizing overall system performance and density by improving the memory system/sub-system design and/or structure. High-availability systems present further challenges as related to overall system reliability due to customer expectations that new computer systems will markedly surpass existing systems in regard to mean-time-between-failure (MTBF), in addition to offering additional functions, increased performance, increased storage, lower operating costs, etc. Other frequent customer requirements further exacerbate the memory system design challenges, and include such items as ease of upgrade and reduced system environmental impact (such as space, power and cooling).

FIG. 1 relates to U.S. Pat. No. 5,513,135 to Dell et al., of common assignment herewith, and depicts an early synchronous memory module. The memory module depicted in FIG. 1 is a dual in-line memory module (DIMM). This module is composed of synchronous DRAMs 8, buffer devices 12, an optimized pinout, and an interconnect and capacitive decoupling method to facilitate high performance operation. The patent also describes the use of clock re-drive on the module, using such devices as phase-locked loops (PLLs).

FIG. 2 relates to U.S. Pat. No. 6,173,382 to Dell et al., of common assignment herewith, and depicts a computer system 210 which includes a synchronous memory module 220 that is directly (i.e. point-to-point) connected to a memory controller 214 via a bus 240, and which further includes logic circuitry 224 (such as an application specific integrated circuit, or "ASIC") that buffers, registers or otherwise acts on the address, data and control information that is received from the memory controller 214. The memory module 220 can be programmed to operate in a plurality of selectable or programmable modes by way of an independent bus, such as an inter-integrated circuit (I2C) control bus 234, either as part of the memory initialization process or during normal operation. When utilized in applications requiring more than a single memory module connected directly to a memory controller, the patent notes that the resulting stubs can be minimized through the use of field-effect transistor (FET) switches to electrically disconnect modules from the bus.

Relative to U.S. Pat. Nos. 5,513,135, 6,173,382 further demonstrates the capability of integrating all of the defined functions (address, command, data, presence detect, etc) into a single device. The integration of functions is a common industry practice that is enabled by technology improvements and, in this case, enables additional module density and/or functionality.

FIG. 3, from U.S. Pat. No. 6,510,100 to Grundon et al., of common assignment herewith, depicts a simplified diagram and description of a memory system 310 that includes up to four registered DIMMs 340 on a traditional multi-drop stub bus. The subsystem includes a memory controller 320, an external clock buffer 330, registered DIMMs 340, an address bus 350, a control bus 360 and a data bus 370 with terminators 395 on the address bus 350 and the data bus 370. Although only a single memory channel is shown in FIG. 3, systems produced with these modules often included more than one discrete memory channel from the memory controller, with each of the memory channels operated singly (when a single channel was populated with modules) or in parallel (when two or more channels where populated with modules) to achieve the desired system functionality and/or performance.

FIG. 4, from U.S. Pat. No. 6,587,912 to Bonella et al., depicts a synchronous memory module 410 and system structure in which the repeater hubs 420 include local re-drive of the address, command and data to the local memory devices 401 and 402 via buses 421 and 422; generation of a local clock (as described in other figures and the patent text); and the re-driving of the appropriate memory interface signals to the next module or component in the system via bus 400.

FIG. 5 depicts a contemporary system composed of an integrated processor chip 500, which contains one or more processor elements and an integrated memory controller 510. In the configuration depicted in FIG. 5, multiple independent cascade interconnected memory interface busses 506 are logically aggregated together to operate in unison to support a single independent access request at a higher bandwidth with data and error detection/correction information distributed or "striped" across the parallel busses and associated devices. The memory controller 510 attaches to four narrow/high speed point-to-point memory busses 506, with each bus 506 connecting one of the several unique memory controller interface channels to a cascade interconnect memory subsystem 503 (or memory module) which includes at least a hub device 504 and one or more memory devices 509. Some systems further enable operations when a subset of the memory busses 506 are populated with memory subsystems 503. In this case, the one or more populated memory busses 508 may operate in unison to support a single access request.

It is often desirable to utilize prior generation memory subsystems (often produced in the form of memory modules or DIMMs) in newly acquired computers, as a means of reducing the required (initial) investment in the new computing environment, as well as to maximize the return on the investment in previous system(s). In some cases, the re-use of legacy (previous generation) memory modules in current generation memory systems is identified as a requirement by potential customers, thereby necessitating solutions for this re-use to be included in the design and/or production of current generation memory systems/sub-systems. The adoption of revolutionary memory structures in current generation memory systems can significantly impede and/or prevent the re-use of legacy modules unless sufficient 'design hooks' and other architecture and/or design innovations are included in the revolutionary memory structure. Further, it is necessary to retain a high degree of fault-tolerance when using the legacy modules in current generation memory systems. Ideally, the degree of fault-tolerance when the legacy modules are used in the new systems equals or exceeds that of the legacy memory modules when used in the prior generation systems.

BRIEF SUMMARY OF THE INVENTION

An embodiment includes a memory adapter card including two rows of contacts along a leading edge of a length of the card. The rows of contacts are adapted to be inserted into a socket that is connected to a daisy chain high-speed memory bus via a packetized multi-transfer interface. The memory adapter card also includes a socket installed on the trailing edge of the card. In addition, the memory adapter card includes a hub device for converting the packetized multi-transfer interface into a parallel interface having timings and interface levels that are operable with a memory module having a parallel interface that is inserted into the socket. In addition, the hub device converts the packetized multi-transfer interface into a parallel interface having timings and interface levels that are operable with a memory module having a parallel interface that is inserted into the socket. The hub device also converts the parallel interface into the packetized multi-transfer interface.

Another embodiment includes a memory subsystem that includes a memory module having a parallel interface and a memory adapter card. The memory adapter card includes two rows of contacts along a leading edge of a length of the card. The two rows of contacts are adapted to be inserted into a socket that is connected to a daisy chain high-speed memory bus via a packetized multi-transfer interface. The memory adapter card also includes a socket and a hub device. The socket is installed on the trailing edge of the card and the memory module is inserted into the socket. The hub device converts the packetized multi-transfer interface into the parallel interface having timings and interface levels that are operable with the memory module, and it converts the parallel interface into the packetized multi-transfer interface. The memory module and the memory adapter card operate as a dynamic memory storage medium on the memory bus.

A further exemplary embodiment includes a method for operating a memory module having a parallel interface on a packetized multi-transfer interface operating at a higher speed than the parallel interface. The method includes electrically connecting the parallel interface memory module to a hub device operable as a bus converter to convert a packetized multi-transfer interface bus to a programmable parallel interface bus which provides one or more of address, command, data and clock signals in a manner that is compatible with the parallel interface memory module. The electrical connection from the hub device to the memory module is programmed in regard to one or more of drive strength, terminations, timings and clock relationships. Information from a memory controller or processor to the parallel interface memory module over the packetized multi-transfer interface bus using a downstream frame format. The downstream frame format includes data bits which include one or more of address, command, control and memory data information depending on a frame type associated with the information. The information from the packetized, multi-transfer interface bus is converted into a format compatible with the memory module parallel interface bus to enable operation of the parallel interface memory module.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES:

FIG. 6 (including FIGS. 6A and 6B) show respectively the front and back views of a prior generation memory subsystem;

FIG. 8 (including FIGS. 8A, 8B and 8C) is a table illustrating a functional pin layout of an exemplary 276-pin DIMM that may be utilized by the previous generation memory system;

FIG. 12 depicts an exemplary downstream frame format that may be utilized by the current generation memory system to transfer information downstream from the memory controller to the memory modules;

FIG. 13 (including FIGS. 13A and 13B) is a table illustrating a functional pin layout of an exemplary 276-pin DIMM that may be utilized by the current generation memory system;

FIG. 14 (including FIGS. 14A, 14B and 14C) is a table illustrating a functional pin layout of an exemplary 276-pin DIMM that may be utilized by the current generation memory system;

DETAILED DESCRIPTION OF EXEMPLARY EMBODIMENTS

Figure 1:
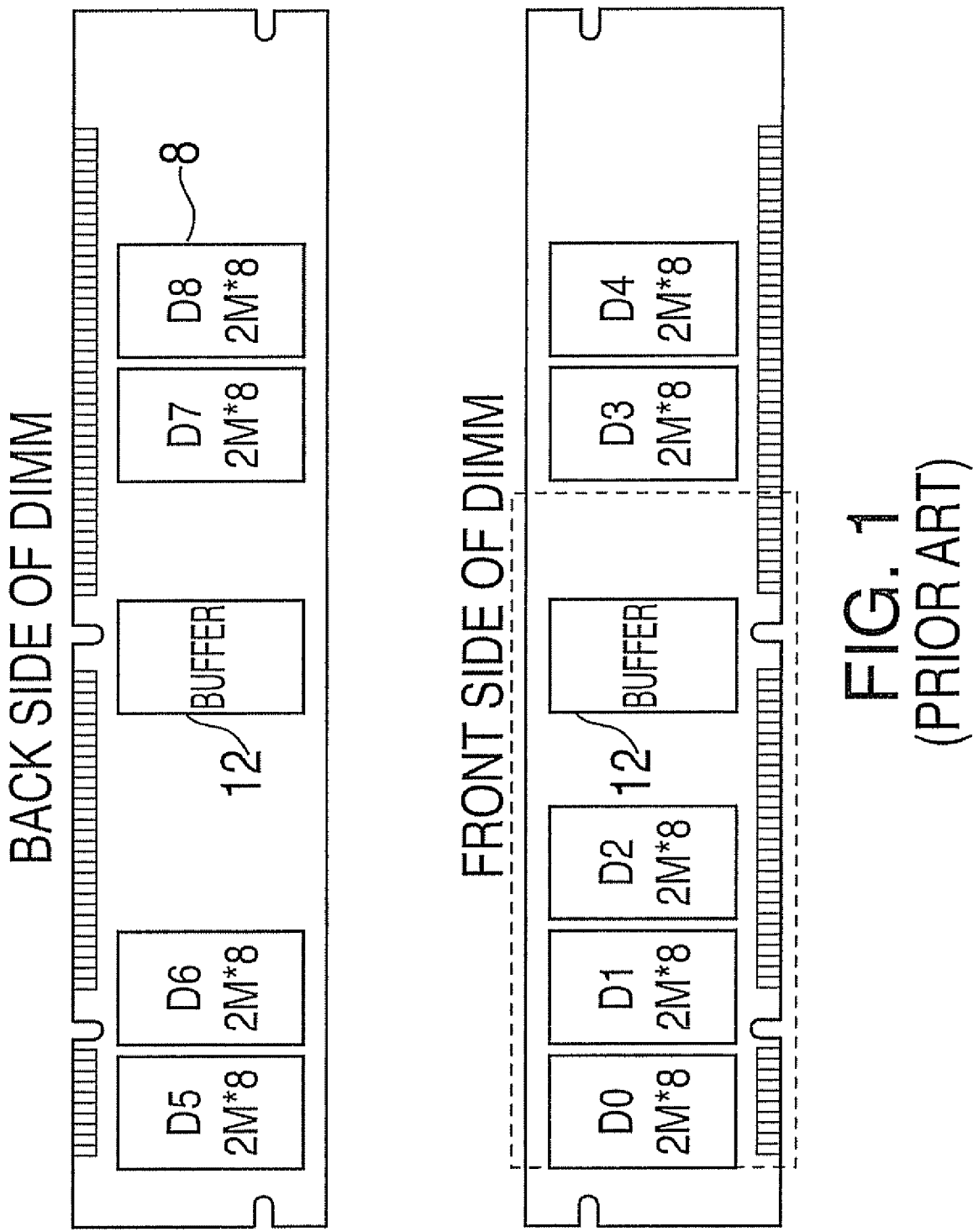
FIG. 1 depicts an exemplary early synchronous memory module.
Figure 2:
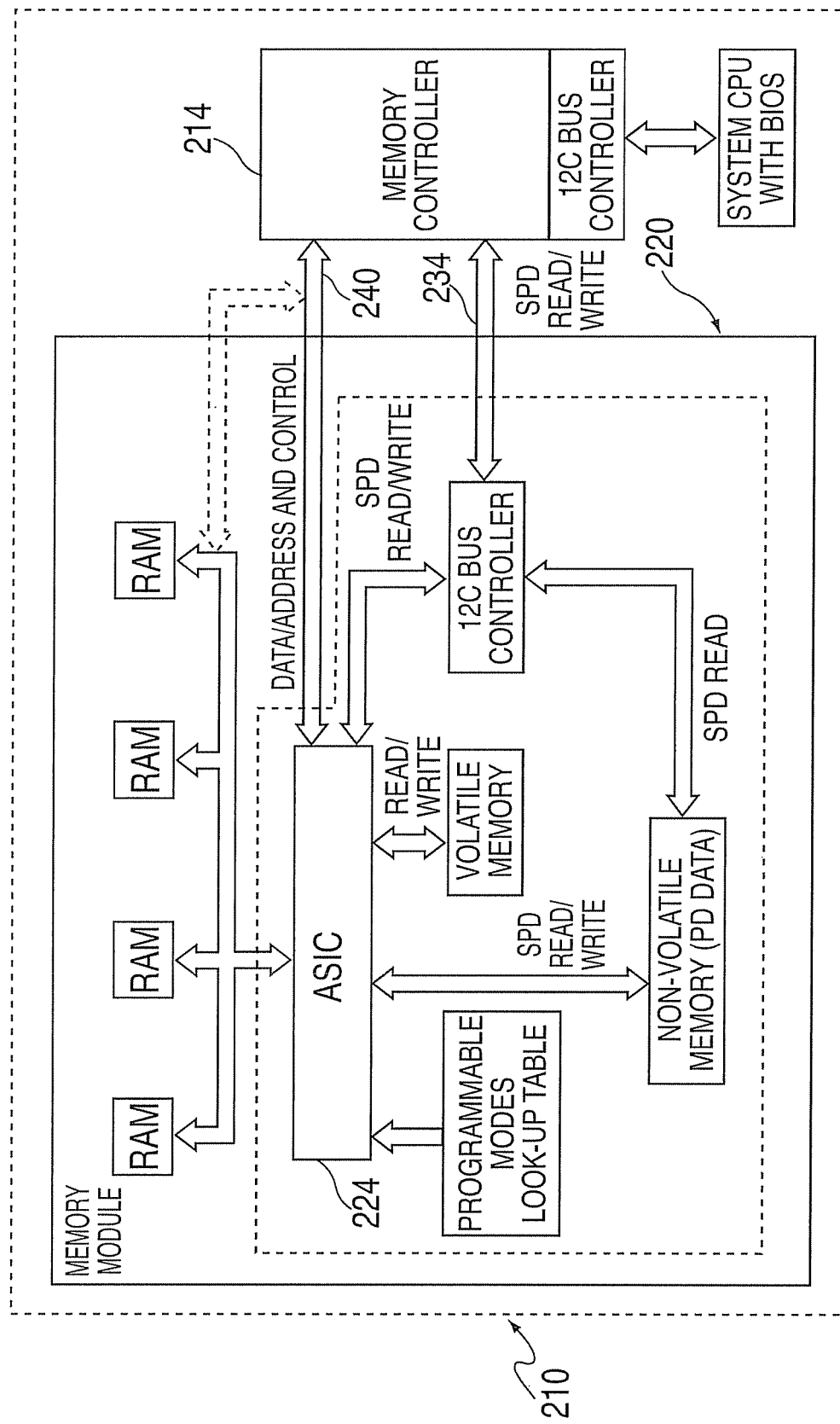
FIG. 2 depicts an exemplary computer system with a fully buffered synchronous memory module that is directly connected to a memory controller.
Figure 3:
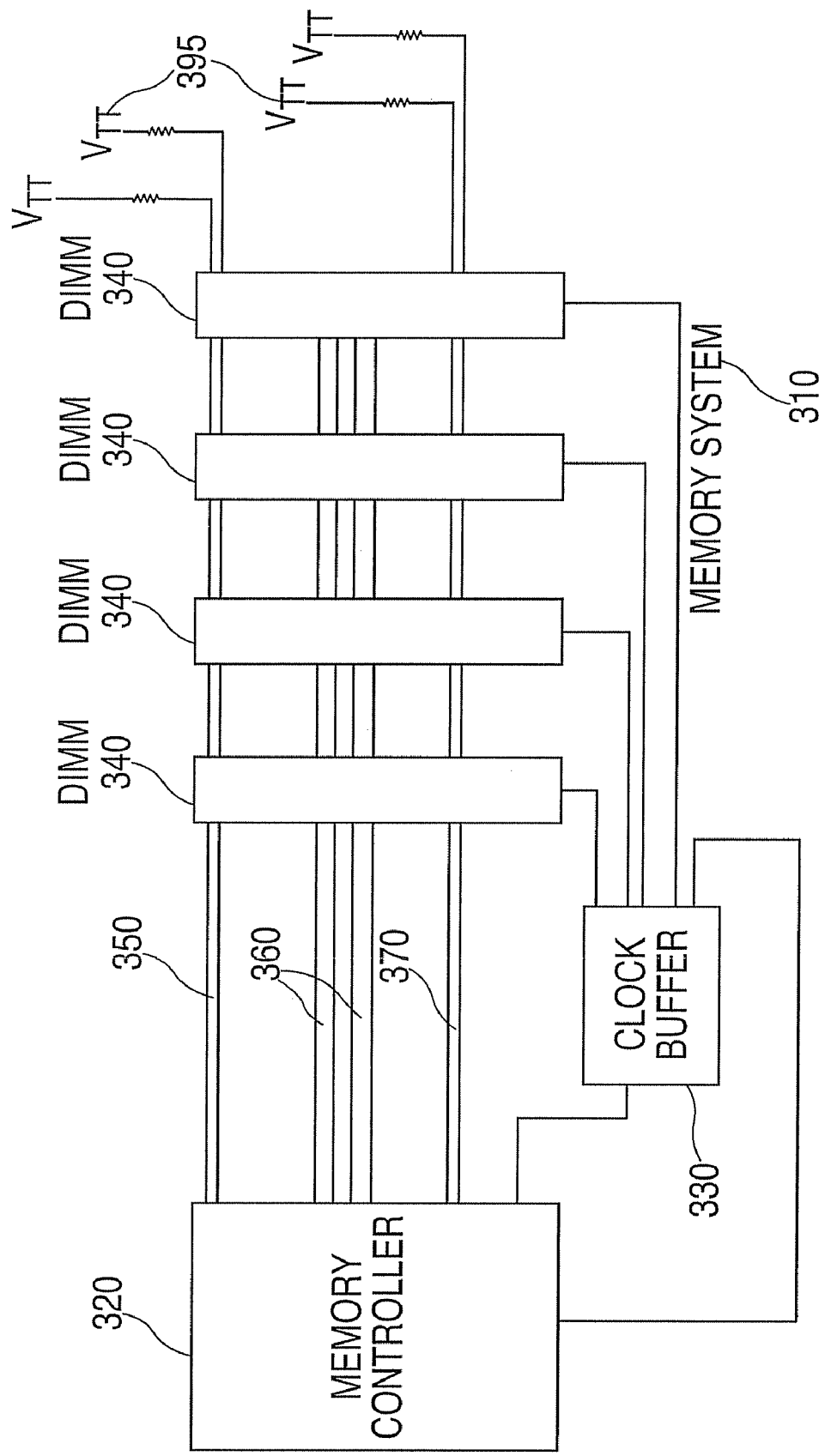
FIG. 3 depicts an exemplary memory system, shown with a single, traditional multi-drop stub bus.
Figure 4:
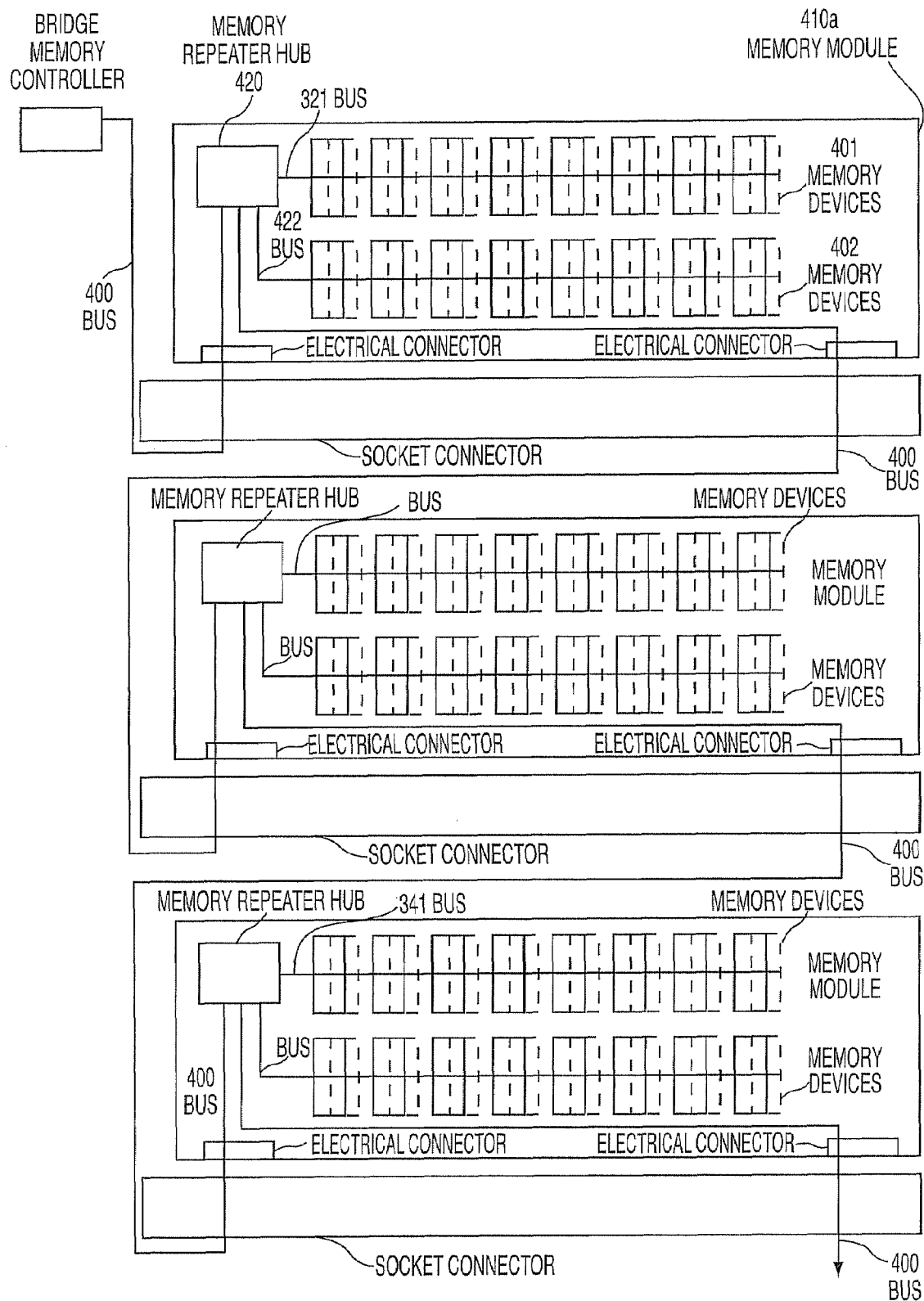
FIG. 4 depicts a fully buffered synchronous memory module and system structure, where the fully buffered synchronous memory module includes a repeater function.
Figure 4A:
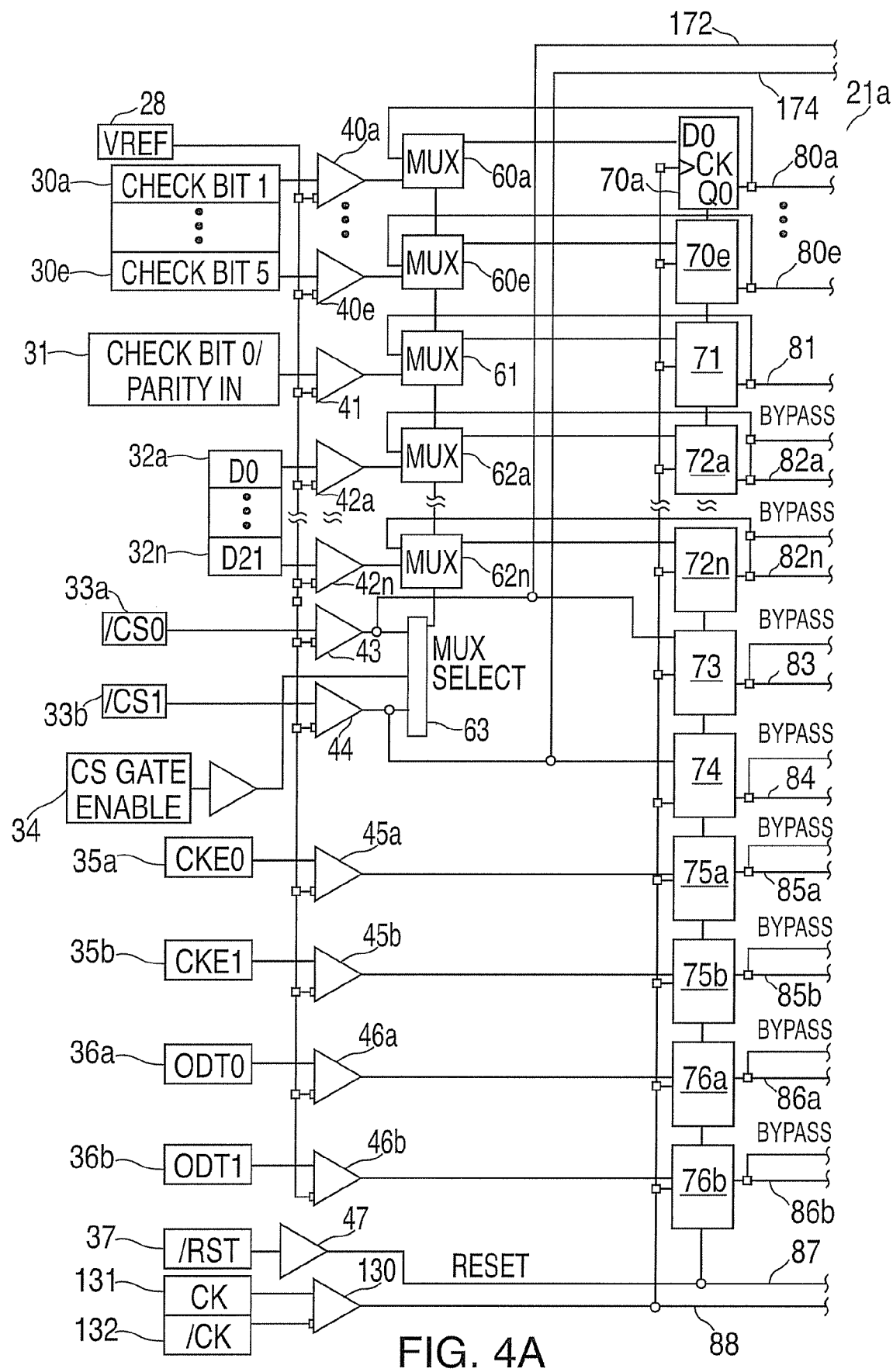

An exemplary embodiment described herein provides a system and method for interfacing previous generation memory subsystems (e.g., parallel interface memory subsystems designed for use in multi-drop systems) to a current generation memory system that utilizes a packetized interface on a high-speed narrow bus and a daisy chained memory system architecture. The signal interfaces and physical designs are not compatible between the new and prior generation memory subsystems, so an adapter card is utilized to convert between the previous generation memory subsystem and the current generation memory system architecture. In exemplary embodiments, the current generation memory system architecture uses a DIMM design that includes a buffer device (e.g., an ASIC) residing on the DIMM to perform the function of interfacing the memory controller bus to the memory device (e.g., DRAM) components. The pin definitions of the DIMM are unique to that application and differ from the pin definitions on previous generation of memory subsystems, or DIMMs. Further exemplary embodiments described herein provide a system and method for interfacing the previous generation of DIMMs with the current generation memory system structure via the buffer device while maintaining the same DIMM pitch. A new DIMM socket, as described herein, is attached to the edge of an adaptor card. The new DIMM socket has the same physical interface as the pin edge connector in the previous generation of DIMMs and also allow for assembly on the edge of the adaptor card. Further exemplary embodiments also include additional mechanical means of strengthening the connection of the socket to the adaptor card to prevent unwarranted flexing.

As described herein, an exemplary embodiment enables the use of a memory module designed to operate in a multi-drop architecture (as utilized in the prior generation system and including a parallel interface, redundant contacts, and ECC across data, address and commands) in a cascade interconnect memory system (as utilized in current generation memory systems and including packetized data, a high speed narrow bus, bit lane sparing, and ECC across data, address, commands, and bus transfers). In an exemplary embodiment the prior generation memory subsystem can take advantage of the enhanced ECC functions of the current generation system when the previous generation subsystem is used in conjunction with the adapter card described herein. An example of a prior generation memory subsystem is described herein and in U.S. Patent Publication Number U.S. 2004/0205433 to Gower et al., of common assignment herewith and incorporated herein by reference in its entirety. An example of a current generation memory module is described herein and in U.S. Patent Publication Number U.S. 2006/0023482A1 to Dreps et al., of common assignment herewith and incorporated herein by reference in its entirety.

FIGS. 6A and 6B show respectively the front and back views of a prior generation memory subsystem. Generally speaking, DIMMs are printed circuit cards designed to carry a plurality of DRAMs 22 thereon and the DRAM output pins (not shown) are connected via the printed circuit to selected connectors 23 along the edge of both the back and front sides of the card and are often provided with a single indexing key or notch 9 on the connector edge. The use and manufacture of such DIMMs is well known and need not be further described herein. The DIMM 20 depicted in FIGS. 6A and 6B is designed to address several significant contributors to unplanned and often catastrophic system outages. This is realized by having the length of DIMM 20 between 149 mm and 153 mm. Nominally the DIMM 20 is 151.35 mm (5.97 inches) long and its width is 43.1 nm (1.2 inches). The width of the DIMM is not critical and the DIMM need only be wide enough to accommodate the DRAMs 22 installed thereon. The length of the DIMM 20 however must be such that the DIMM 20 can accommodate additional signal contacts, up to 138, as well as up to thirty-six DRAMs 22 having a body size up to 14 mm by 21 mm and have a locating key or notch 9 a distance of between 82.675 mm from one end of the DIMM 20 and 68.675 mm from the other end of the DIMM 20 as shown. Again, it should be understood that these dimensions are nominal and may vary plus or minus 3 mm in various implementations.

The DIMM 20 depicted in FIGS. 6A and 6B can also be provided with additional notches 9A and 9B on each side, i.e., the shorter edges of the DIMM 20. These dimensions permits the DIMM 20 depicted in FIGS. 6A and 6B to accommodate placing up to nine DRAMs 22 (either in single device packages or comprised of stacked packages) on the front surface and up to an additional nine such DRAMs 22 (also either in single device packages or comprised of stacked packages) on the rear surface. Further, as shown in FIG. 6A, on the front of each DIMM 20, in addition to the DRAM 22s, there is positioned a phase locked loop chip 24 and an ECC/Parity Register chip 21. The ECC/Parity Register chip 21 will be further described below and in detail in conjunction with FIGS. 7A and 7B. It should be understood that the phase locked loop chip 24 can be eliminated if its circuitry is provided on the ECC/Parity register chip and/or included in a multi-chip package 21.

The previous generation DIMM 20, shown in FIGS. 6A and 6B, accommodates two hundred and seventy-six contacts or pins 23. These pins are numbered and coupled to respective inputs as shown in FIGS. 8A, 8B and 8C. Contact or pin number one (1) is identified and shown in FIG. 6A as contact 23A and is on the left hand side of the front side of the DIMM 20 and is positioned approximately 5.175 mm from the left edge of the DIMM 20 and approximately 77.5 mm from the center of the notch 9. Contact or pin number one hundred and thirty-eight (138) is identified and shown in FIG. 6A as contact 23B and is on the right hand side of the front side of the DIMM 20 and is positioned approximately 5.175 mm from the right edge of the DIMM 20 and approximately 63.5 min from the center of the notch 9. Contact or pin number one hundred and thirty-nine (139) is identified and shown in FIG. 6B as contact 23C and is directly opposite contact number one 23A and is also positioned approximately 5.175 mm from the left edge of the DIMM 20 and is also approximately 77.5 mm from the center of the notch 9. Contact or pin number two hundred and seventy-six (276) is identified and shown in FIG. 6B as contact 23D and is directly opposite contact number one hundred and thirty-eight 23B and is also positioned approximately 5.175 mm from the right edge of the DIMM 20 and approximately 63.5 mm from the center of the notch 9.

The previous generation DIMM 20 also includes an ECC/Parity register 21 to provide a fault tolerant address and command bus. Because the two hundred and seventy-six contacts or pins 23 on this larger DIMM are more than sufficient to meet the needs of all the circuitry on the DIMM, the DIMM provides extra or redundant contacts. These extra or redundant contacts or pins 23 are utilized to provide additional protection for certain selected signal or voltage lines, for which error correction is not possible. Providing such redundant contacts effectively eliminates concerns such as contact failures on clock inputs, CS, CKE, and ODT inputs, Vref inputs, and other signals not protected by ECC. Other benefits include the elimination or reduction of concerns regarding power supply noise and/or voltage drops due to scarcity of voltage (VDD) contacts in the data region as well providing additional ground pins in the address/control region on the DIMM 20.

The additional contact pins 23 permit the inclusion of ECC check bits, associated with address and command inputs, allowing for real-time system monitoring of faults associated with these inputs, as well as system interrogation of fault counts and attributes.

As noted above, the DIMM 20 is provided with a plurality of memory devices or SDRAMs 22, a phase locked loop circuit 24 and an ECC/Parity register 21. The ECC/Parity register 21 on the DIMM 20 includes error correction code (ECC) circuitry that may be coupled to a memory interface chip to provide reliability functions to the memory system. The inclusion of this ECC circuitry results in a reduction in interconnect failures. In exemplary embodiments, the memory interface chip is an interface between a memory controller (or a processor) and the DIMM 20. The DIMM 20 is connected to the memory interface chip via data, address and command lines and the memory interface chip is connected to the memory controller (or a processor) via data, address and command lines. This arrangement, including the memory controller (or a computer processor), a memory interface chip and the DIMM 20 is referred to herein as a server or memory system.

Figure 7A:
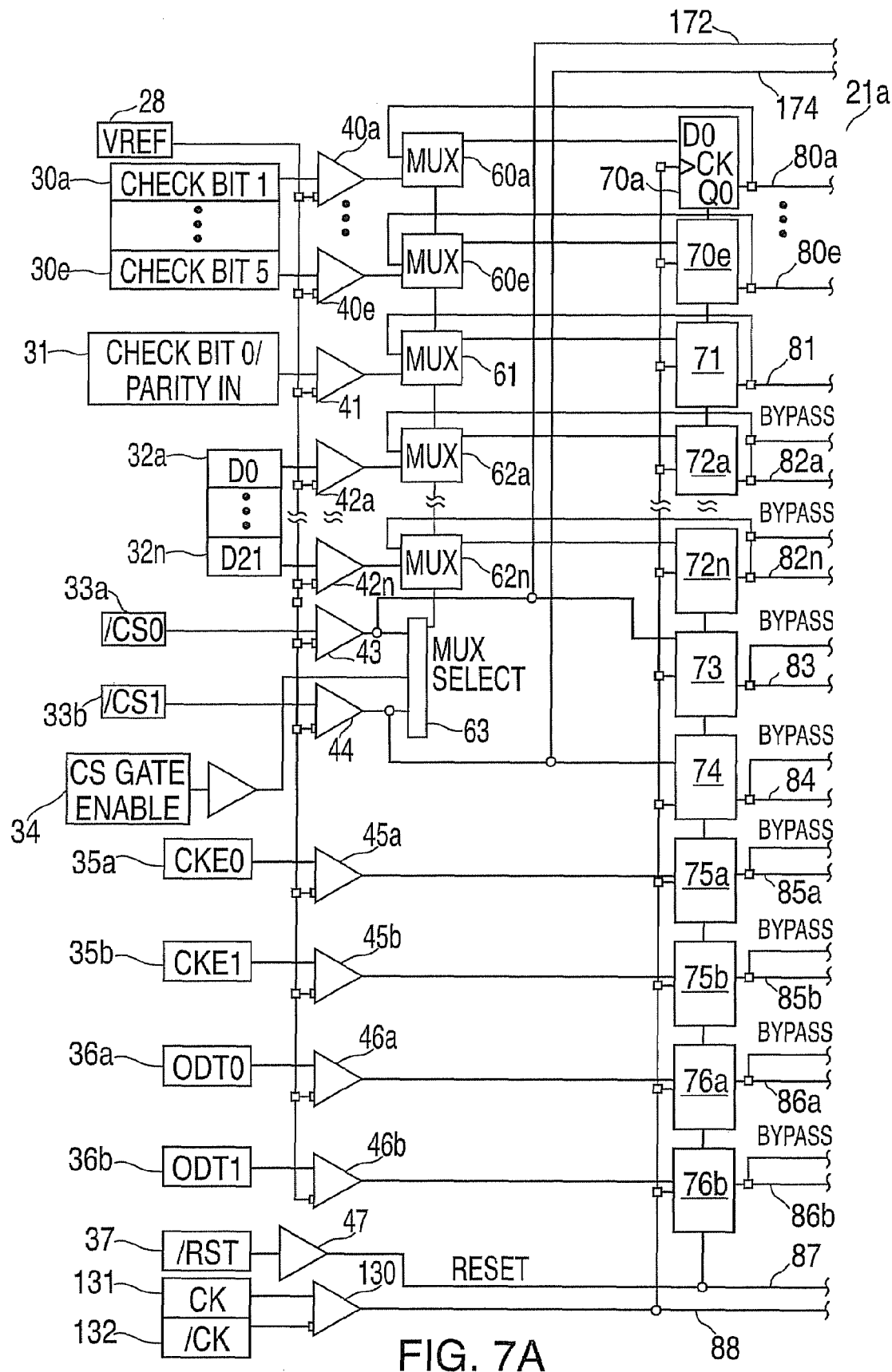
FIG. 7 (including FIGS. 7A and 7B) depict a schematic view of the ECC/Parity register on a previous generation DIMM.
Figure 7B:
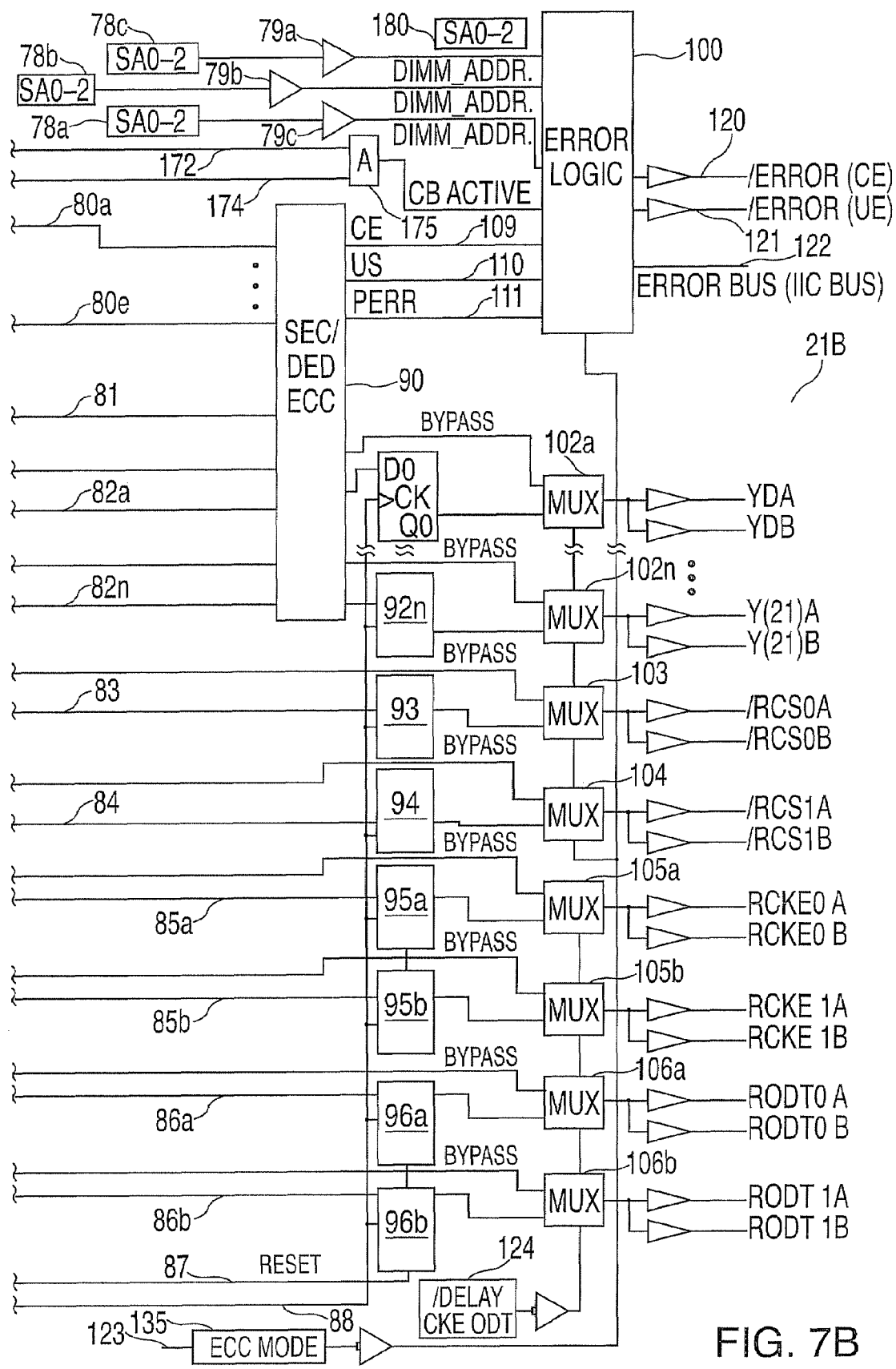

FIGS. 7A and 7B together comprise a schematic view of the ECC/Parity register 21 on DIMM 20 where, for clarity in description, it is shown as comprised of two distinct sections 21a and 21b. FIG. 7A depicts a 28 bit 1:2 register segment 21a and FIG. 7B shows the error correction code circuit segment 21b. The error correction code circuit ECC segment 21b, shown in FIG. 7B, corrects for single bit errors and thus permits continuous memory operation independent of the existence of these errors. The ECC segment 21b also includes a parity operating mode circuitry together with error reporting circuitry. The ECC/Parity register 21 on DIMM 20 thus provides a high level of performance and reliability with timing requirements generally consistent with the JEDEC 14 bit 1:2 DDR II register.

More particularly, the register segment 21a contains a plurality of so called differential bit receivers 40a through, 40e, 41, 42a through 42n, 43, 44, 45a, 45b, 46a and 46b and a single amplifier 47. Each of these differential receivers 40a through 40e, 41, 42a through 42n, 43, 44, 45a, 45b, 46a and 46b has two inputs and a single output. One of the inputs of each differential receiver 40a through, 40e, 41, 42a through 42n, 43, 44, 45a, 45b, 46a and 46b is coupled to a reference voltage source 28. The second input of the each of the differential receivers 40a through, 40e, 41, 42a through 42n, 43, 44, 45a, 45b, 46a and 46b are coupled to respective inputs 30a through, 30e, 31, 32a through 32n, 33a, 33b, 34, 35a, 35b, 36a and 36b.

Receiver set 40a through 40e is comprised of five receivers of which only the first and the last receivers, 40a and 40e, are shown. Receivers 40a through 40e have their second inputs respectively coupled to respective check bit lines 30a through 30e and their outputs connected through respective primary multiplexers 60a through 60e to the inputs of respective primary latches 70a through 70e. Typically the check bit lines are contained in a bus that contains a set of five such check bit lines. However, for simplification of the drawing and ease of description only, FIG. 7A shows only the first and the last check bit lines 30a and 30e of the set and the first and last of the receivers 40a through 40e. It is understood that each receiver in the set 40a through 40e has one of its respective inputs coupled to a respective one of a set of check bit input lines 30a through 30e and its output to a respective one of a set of three input multiplexers and thence to a respective one of a set of three input primary latches.

The second input of the differential receiver 41 is coupled to a check bit 0/Parity_in signal line 31.

Receiver set 42a through 42n is comprised of twenty-two receivers coupled to a data line bus typically containing twenty-two data lines 32a through 32n. However, for simplification of the drawing and ease of description only, FIG. 7A shows only the first and the last data lines 32a and 32n of the set and the first and last of the receivers 42a through 42n are shown in the drawing. The first receiver 42a is shown as having its first input coupled to data bit line 32a and its output coupled to the first input of multiplexer 62a whose output is coupled to a first input of primary latch 72a and the last receiver 42n is shown as having its first input coupled to data bit line 32n and its output coupled to the first input of multiplexer 62n whose output is coupled to a first input of primary latch 72n. Each respective receiver in set 42a through 42n has an input coupled to a respective one of data lines in set 32a through 32n and their outputs connected through respective primary multiplexers 42a through 42n to the inputs of respective primary latches 62a through 62n. All the primary multiplexers and latches in the set 42a through 42n are identical to those shown connected to receivers 42a and 42n. Thus each receiver in the set has one of its respective inputs coupled to a respective one of a set of data bit input lines and its output to a respective one of a set of two input multiplexers and thence to a respective one of a set of primary latches. These signals are inputted from a memory interface chip and are re-driven only when one or more of the inputs 33a, 33b, or 34 are low.

As previously noted, the second input of the differential receiver 41 is coupled to a check bit 0/Parity_in signal line 31. The output of the differential receiver 41 is coupled to an input of multiplexer 61 whose output is coupled to a primary latch 71. The check bit 0/Parity_in signal is interpreted as an ECC check bit from the memory controller or as a parity bit depending on the setting of ECC mode input 136 (FIG. 7B). Clock inputs 131 are fed to all the primary latches 70a through 70e, 71, 72a through 72n, 73, 74, 75a, 75b, 76a and 76b. The Check bits 1-5 at inputs 30a through 30e are in a "don't care" state when the register is being operated in parity mode and will be held low. When these inputs are operated in parity mode, a parity in signal will be provided on the Check bit 0/Parity_in signal line 30 and maintain odd parity across the data inputs 32a through 32n, at the rising edge of the clock signal (CK) at input 131 that immediately follows the rising edge of clock 131 that occurred simultaneously with the associated data inputs 32a through 32n.

The second inputs of the differential receivers 43 and 44 are respectively coupled to chip select lines /CS0 and /CS1 and the outputs of the differential receivers 43 and 44 are coupled respectively to the first inputs of primary latches 73 and 74 as well as to the first and second inputs of a three input select NAND gate 63. The output of NAND gate 63 is coupled to the selection input of the multiplexers 60a through 60e, 61 and 62a through 62n. These lines initiate DRAM address/command decodes and as such at least one will be low when a valid address/command signal is present and the register can be programmed to redrive all the data inputs when at least one chip select input (CS0, /CS1) 33a, 33b is low. The third input of this NAND gate 63 is coupled to CS gate enable circuit 34 which can be set low to cause multiplexers 60a through 60e to pass signals from receivers 32a through 32n independent of the levels on inputs 33a and 33b.

The output of differential receiver 43 and 44 are also respectively coupled through the lines 172 and 174 and the AND gate 175 (FIG. 7B) whose output is coupled to the error logic circuit 100 also shown in FIG. 7B.

Receiver 45a has an input coupled to the clock enable signal source 35a (CKE0) and an output coupled to the primary latch 75a.

Receiver 45b has an input coupled to the clock enable signal sources 35b (CKE1) and an output coupled to the primary latch 75b.

Receiver 46a has an input coupled to the on die termination line signal input line 36a (ODT0) and an output coupled to the primary latch 76a.

Receiver 46b has an input coupled to the on die termination line signal line 36b (ODT1) and an output coupled to the primary latch 76b.

Receiver 47 has an input coupled to the reset (/RST) signal line 37. The inputs 35a and 35b (CKE0, CKE 1), 36a and 36b (ODT0, ODT1) are provided from the memory interface chip and are not associated with the Chip Select (CS) inputs 33a and 33b. The signal from source 37 (/RST) driving amplifier 47 is an asynchronous reset input and, when low, resets all the primary latches 70a through 70e, 71, 72a through 72n, 73, 74, 75a, 75b, 76a, 76b and all the secondary latches 92a through 92n, 93, 94, 95a, 95b, 96a and 96b thereby forcing the outputs low. This signal from source 37 (/RST) also resets the error bus registers and error lines from the error logic circuit 100.

Coupled to the above described register of FIG. 7A is the error correction code circuit arrangement of FIG. 7B.

In FIG. 7B, module location identification is provided to error logic circuit 100. This module location identification is provided to error logic circuit 100 through receivers 79a, 79b, and 79c whose inputs are coupled to DIMM address input range sources (SA0, SA1, SA2) 78a, 78b and 78c and whose outputs are coupled to an error logic circuit 100. The signals from sources (SA0, SA1, SA2) 78a, 78b and 78c define the DIM address which is then reported on the error bus when requested by the system. The error logic circuit 100 is controlled by a signal from the NAND gate 175 when either of the DRAM chip select signal sources (/CS0) 33a and (/CS1) 33b are active. The error logic circuit 100 further has a reset signal source 180 coupled thereto.

Also included in the error correction code circuit of FIG. 7B is a SEC/DED ECC circuit 90. Coupled to this SEC/DED ECC circuit 90 are the outputs of primary latches 70a through 70e, 71 and 72a through 72n. This SEC/DED ECC circuit 90 provides three outputs 109, 110, and 111 to the error logic circuit 100. These outputs are: a correctable error (CE) line 109, an uncorrectable error (UE) line 110 and a parity error bit line 111 fed to the error logic circuit 100 which provides outputs regarding correctable and uncorrectable errors on output lines 120 and 121. When either correctable error (CE) line 109 or uncorrectable error line (UE) 110 is low this indicates that an error was identified as being associated with the address and/or command inputs (either correctable or uncorrectable). The error lines 120,121 will be active, i.e., low, for two clock cycles simultaneous with the re-driven address/command data when operating in ECC mode or delayed by two clock cycles when operating in parity mode. The logic error circuit 100 also provides an Error Bus (Inter Integrated circuit or IIC) 122 for external collection of error information such as error type, DIMM address, error count and status of the 28 input and internally generated syndrome bits at the time of the first fail. The information remains latched until a reset command is written to bus 122 or /RST input 37 is switched low. The selected IIC protocol allows unique byte addressing of the nine registers, consistent with the present industry standard protocol for serial program decode electronic erasable programmable read only memory (SPD EEPROM) and is well known to the art.

The SEC/DED ECC circuit 90 also has data bit outputs coupled through secondary latches 92a through 92n to a first input of all the output or secondary multiplexers 102a through 102n. The output of register latches 72a through 72n labeled BYPASS are directly connected to the second input of the output or secondary multiplexers 102a through 102n thereby allowing the SEC/DED ECC circuit 90 to be bypassed depending on the ECC mode input 123.

The output of the primary or register latches 73, 74, 75a, 75b, 76a and 76b are all coupled to a first input of secondary or output latches 93, 94, 95a, 95b, 96a and 96b and through these secondary latches 93, 94, 95a, 95 b, 96a and 96b to a first input of output or secondary multiplexers 103, 104, 105a, 105b, 106a and 106b. The outputs of primary latches 73, 74, 75a, 75b, 76a and 76b are connected directly to a second input of output or secondary multiplexers 103, 104, 105a, 105 b, 106a and 106b thereby allowing secondary latches 93, 94, 95a, 95b, 96a and 96b to be bypassed based on the /Delay CKE input 124 and /ECC mode input 123.

The control circuit depicted in FIG. 7A also includes a differential register 130 that has a first input coupled to a CK signal input 131, a second input coupled to a /CK signal input 132 and its output coupled to a second input all the primary latches 70a through 70e, 71, 72a through 72n, 73, 74, 75a, 75b, 76a and 76b and to the second input of all the output or secondary latches 92a through 92n, 93, 94, 95a, 95b, 96a and 96b and to the error logic circuit 100 via line 88. The /ECC mode signal source 135 is coupled to a selection third input of secondary multiplexers 102a through 102n, 103 and 104 and to the error logic circuit 100. The output or secondary multiplexers 105a, 105b, 106a and 106b have their selection inputs coupled to a source 124 of/Delay, CKE_ODT signals.

In an exemplary embodiment, the ECC code selected for this module is a single error collection/double error detection (SEC/DED) code. The use of this SEC/DED code ensures that all single errors associated with the address and control bits are detected and corrected and that all double bit errors are detected. It should be noted that interconnect failures almost exclusively begin as single point fails, with other failures possibly occurring over time dependent or independent of the root cause of the initial fail.

In summary, the prior generation memory subsystem described herein is a DIMM 20 having a 28 bit 1:2 register with ECC incorporated therein for correcting single bit errors while permitting continuous memory operation independent of the existence of these errors. A parity operating mode is also provided, in conjunction with error reporting circuitry to permit the system to interrogate the device to determine the error condition.

The above described 28 bit 1:2 register of the prior generation DIMM 20 provides key operational features including: error detection and collection on key inputs; programmable delay for un-gated inputs; parity mode; reset circuitry; error reporting and identification and reporting of the DIMM address.

The prior generation DIMM also utilizes the CS gating of key inputs, e.g., /CS 0 and /CS1, as a means of reducing device power for the internal latches which will only be updated when one or both of the chip select (CS) inputs are active low (and chip select gate enable tied high) at the rising edge of the system clock. The twenty-two chip select-gated signals associated with this function include addresses continuously re-driven at the rising edge of every clock depending on the state of chip select. However, the chip select gating function can be disabled by tying the chip select gate enable input low thereby enabling all internal latches to be updated on every rising edge of clock.

The prior generation DIMM described herein also implements programmable delay for un-gated inputs (/Delay CKE-ODT) associated with CKE and ODT (DRAM signals). The inputs are latched and re-driven on each rising edge of the clock signal (CLK,) independent of the state of the chip select (CS) signals. However, since some controllers may be designed with limited flexibility regarding latency for these signals vs. chip select (CS), address (Addr), row address strobe (RAS), column address strobe (CAS) and write enable (WE), a delay block can be selected to re-align the timing relationships which are offset by 1 clock when the error correction code circuitry (ECC) is enabled.

For all inputs gated by CS, on-chip SEC/DED ECC logic is enabled and the signal received oil CHK 0/Parity in is received as check bit 0 when /ECC Mode input is low. This ECC logic will operate across 28 inputs (22 'CS-gated' inputs and the 6 check bits) and will correct all single bit errors and detect all double bit errors present on the twenty two chip select gated data inputs. If a correctable error is detected, /Error (CE) will be driven low for two clocks and errors will be counted and latched in the error bus registers for the 28 inputs if this is the first error since a reset is issued. Any double bit error will also be detected (as well as many other errors that are not correctable), and will be reported on the /Error (UE) error line (driven low for two clocks) and in the error bus registers if this error is the first since a Reset is issued. Although CS0-1 are not included in the ECC logic, the propagation delay of the CS output signals track the signals included in the ECC logic (1 additional clock of latency). In addition to the above ECC mode, the same twenty two chip select gated data signals can be operated in 'parity' mode (/ECC Mode high), whereby the signal received on CHK0/Parity in line is received as parity to the register one clock pulse later than the chip select gated data inputs. The received parity bit is then compared to the parity calculated across these same inputs by the register parity logic to verify that the information has not been corrupted. The twenty two chip select gated data signals will be latched and re-driven on the first clock pulse and any error will be reported two clock pulses later via the uncorrectable /Error (UE) line (driven low for two clock pulses) and in the error bus registers. No correction of errors will be completed in this mode. The convention of parity, in this application, is odd parity (odd numbers of 1's across data and parity inputs equals valid parity).

The /RST signal input 37 is used to clear all internal latches (including the error registers), and all outputs will be driven low quickly except the error lines which will be driven high.

Error reporting circuitry is included to permit external monitoring of DIMM operation. Two open-drain outputs are available to permit multiple modules to share a common signal line for reporting an error that occurred during a valid command (/CS=low) cycle (consistent with the re-driven signals). These two outputs are driven low for two clocks to allow the memory controller time to sense the error. /Error (CE) indicates that a correctable error occurred and was corrected by the ECC logic, /Error (UE) indicates that an uncorrectable error occurred and depending on the mode selected is an uncorrectable ECC error or a parity error. Note that the timing of /Error (UE) is different in parity mode vs. ECC mode.

In addition, an error bus (9 registers that can be read and reset via an IIC bus) is available in the previous generation DIMM 20 to permit the device to be interrogated for additional error information, such as the error type (correctable, uncorrectable or parity error), error count and the memory card location (via the SA0-2 address pins which are conventionally wired only to the separate serial program decode (SPD) electronic erasable programmable read only memory (EE PROM). Other information is also available for diagnostics such as the signals received by the register (address/command, control signals, check bits, parity bit) when a chip select (CS) is active low and the associated syndrome bits so that they can be decoded to determine which of the 28 input signals (22 'CS-gated' plus 6 check bits) or internal ECC logic failed. These registers will contain information about the first fail, and the error counter will continue to increment until it is reset or reaches the full count (64K). All registers can be reset by writing the reset error bus command on the IIC bus, or via the /RST pin.

In addition to the use of the ECC structure defined above (included in both the memory interface chip and the register on the DIMM 20), redundant contacts are included on the module pinout to effectively eliminate other possible SPOF (single-point-of-failure) contributors in the interconnect system. Contacts that cannot be protected by the ECC structure described above, for various reasons, include the following: voltage reference (Vref), Clocks, Chip Selects (CS), CKE's, ODT's, VSS/VDD contacts or pins, Error lines, data input on the IIC bus (SDA), data clock on the IIC bus (SCL) and related signals. In the previous generation memory sub-system, each of these contacts is provided with a first contact on a first side of the DIMM and a redundant contact directly opposite the first contact on the opposite side of the DIMM. For example if the voltage reference source 28 is applied via contact or pin 1 on the front side of the DIMM it is also applied via contact or pin 139 on the back side of the DIMM with contact 1 being direct opposite contact 139. Similarly, the SDA signal is applied via contact or pin 135 on the front side of the DIMM 20 and also via the contact or pin 273 on the back side of the DIMM 20 and the SCL signal is applied via contact or pin 136 on the front side of the DIMM 20 and also via contact or pin 274 on the back side of the DIMM 20. A full description of the contact or pin assignment matrix for the previous generation memory module is shown in FIGS. 8A, 8B and 8C. The specific contact placement is selected to maximize fault tolerance. By providing such opposite redundant contacts, problems caused, for example, by a slight bowing of the DIMM 20 will cause low contact pressure on a contact on one side of the DIMM 20 but high pressure on the opposing contact. In such cases good signal flow will always be assured when such redundant and opposing contacts, as discussed above, are used. These opposing and redundant contacts will also facilitate board wiring by minimizing wiring congestion for this solution also permits in-line wiring. The following chart is a listing of the DIMM locations of a few of these contacts.

| SIGNAL | CONTACT or PIN# | SIDE of DIMM | NOMINAL DISTANCE FROM KEY | DIRECTION FROM KEY/NOTCH |
|---|---|---|---|---|
| CS0 | 86 | FRONT | 11.495 mm | RIGHT |
| CS0 | 224 | BACK | 11.495 mm | LEFT |
| CS1 | 91 | FRONT | 16.495 mm | RIGHT |
| CS1 | 229 | BACK | 16.495 mm | LEFT |
| CKE0 | 65 | FRONT | 13.505 mm | LEFT |
| CKE0 | 203 | BACK | 13.505 mm | RIGHT |
| CKE1 | 62 | FRONT | 16.505 mm | LEFT |
| CKE1 | 200 | BACK | 16.505 mm | RIGHT |
| RAS | 222 | BACK | 9.495 mm | LEFT |
| CAS | 87 | FRONT | 12.495 mm | RIGHT |

-continued

| SIGNAL | CONTACT or PIN# | SIDE of DIMM | NOMINAL DISTANCE FROM KEY | DIRECTION FROM KEY/NOTCH |
|---|---|---|---|---|
| WE | 84 | FRONT | 9.495 mm | RIGHT |
| CK0 | 77 | FRONT | 2.495 mm | RIGHT |
| CK0 | 215 | BACK | 2.495 mm | LEFT |
| CK0B | 78 | FRONT | 3.495 mm | RIGHT |
| CK0B | 216 | BACK | 3.495 mm | LEFT |

The ECC function adds a single clock pulse delay (at planned operating frequencies) to the DIMM register performance, which may be of concern to some performance-optimized applications. As such, two additional modes are included on the module that permit the system user to tradeoff performance and reliability. In Parity Mode, the memory interface chip or controller would generate a single parity bit in conjunction with providing the full address and command field to the module. The module would re-drive the address and command bits, to the DRAMs 22, in the next cycle-rather than adding the additional cycle required in ECC mode. Any error on the address and command bus would be reported to the system at a later time, and, the potential for recovery from the fail would be small hence this option is undesirable for many applications. The last mode would be to simply operate the memory in a mode with no parity bits and no ECC bits, with neither the added delay due to ECC nor any means to detect a fault on the address/command bus as per the prior art convention now used for these modules.

Figure 5:
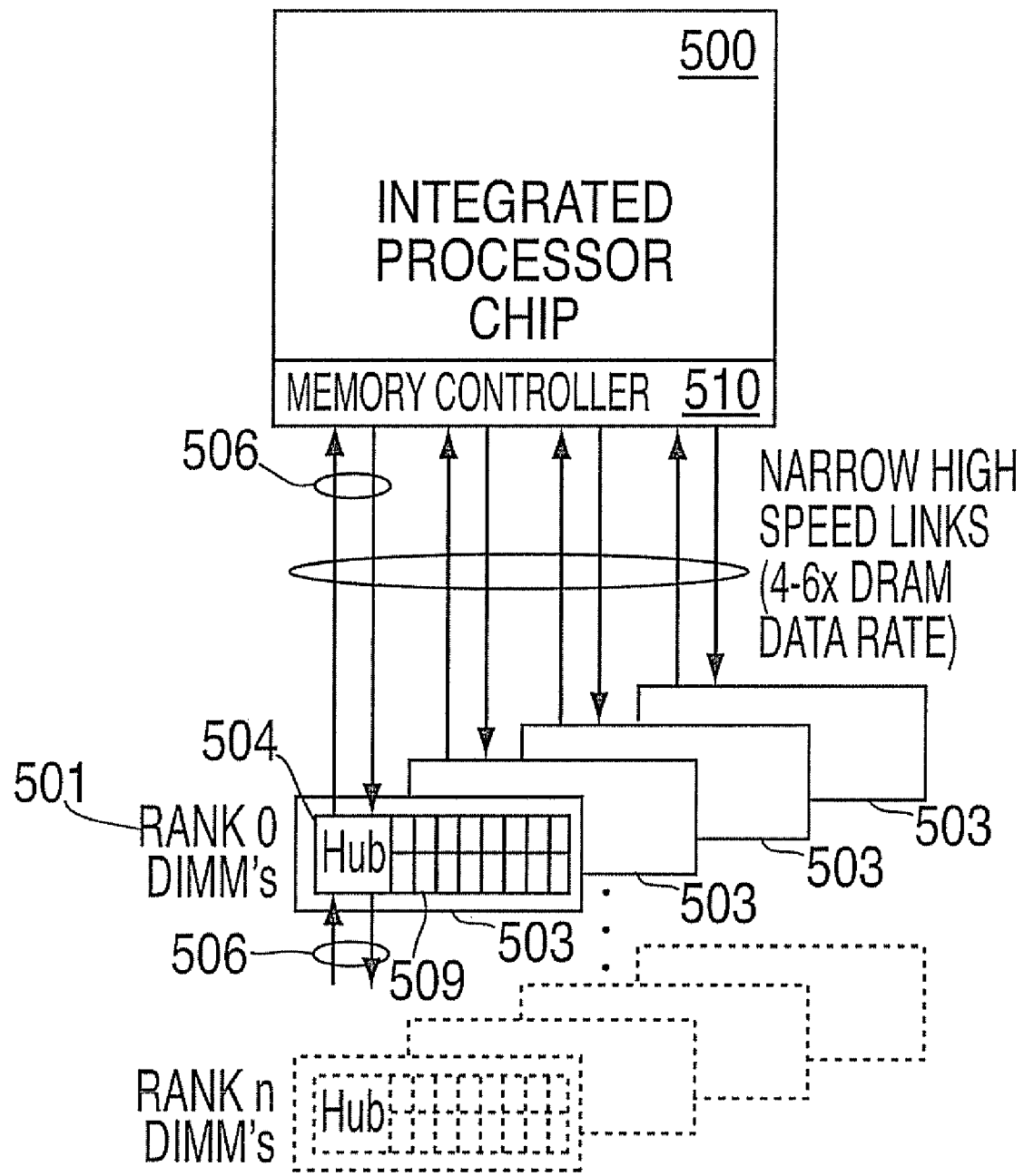
FIG. 5 depicts a block diagram of a computer memory system which includes multiple independent cascade interconnect memory interface busses that operate in unison to support a single data access request.
Figure 9:
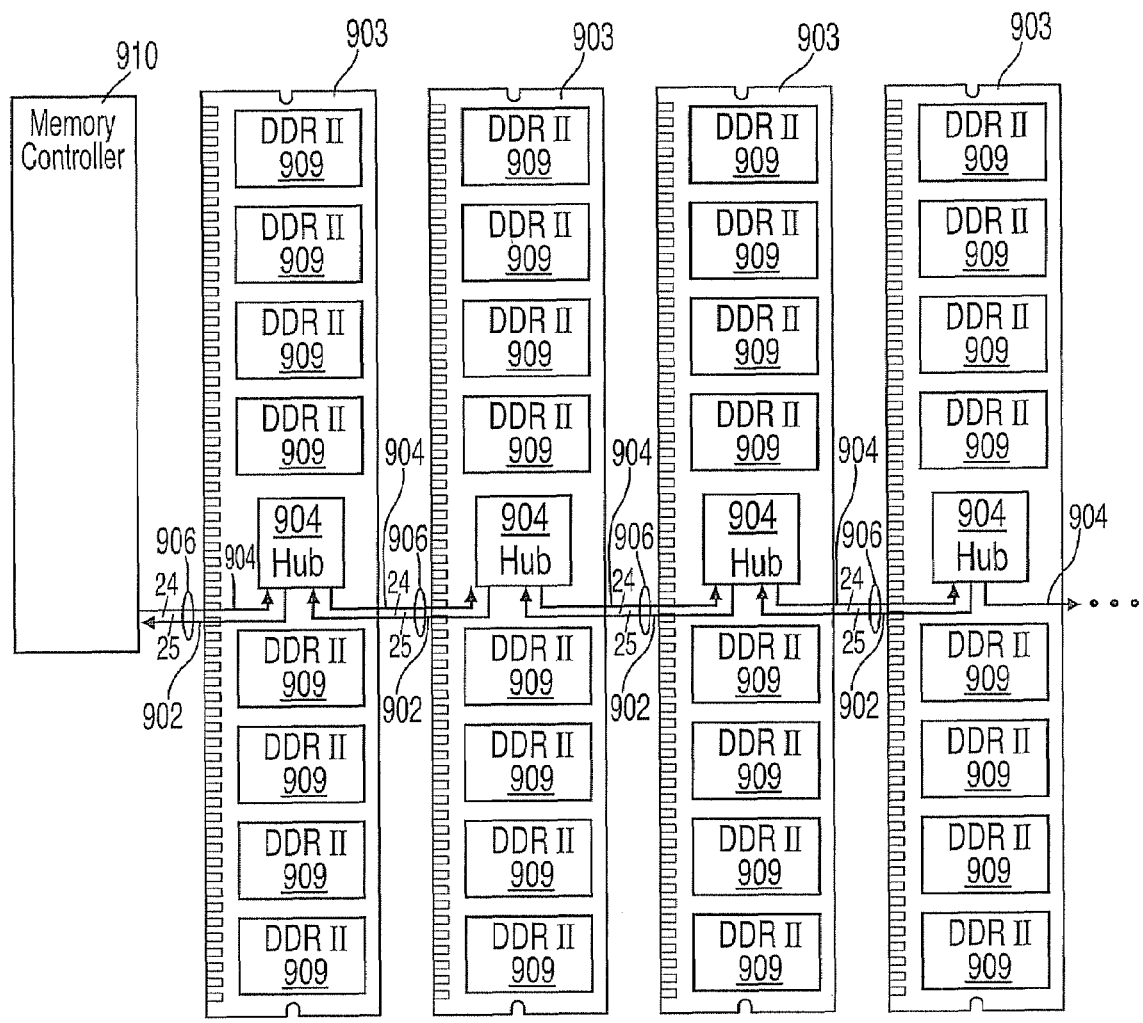
FIG. 9 depicts an exemplary memory structure with cascaded memory modules and unidirectional busses that is implemented by a current generation memory system.

FIG. 9 depicts an exemplary memory structure with cascaded memory modules and unidirectional busses that is implemented by a current generation memory system. The current generation memory system includes a packetized interface, a high-speed narrow bus, and daisy chain connections. FIG. 9 depicts a current generation memory system with cascaded memory modules 903 and unidirectional busses 906. The unidirectional busses 906 includes an upstream memory bus 902 and a downstream memory bus 904. One of the functions provided by the hub devices 904 in the memory modules 903 in the cascade structure depicted in FIG. 9 is a re-drive function to send signals on the unidirectional busses 906 to other memory modules 903 or to the memory controller 910. FIG. 9 includes the memory controller 910 and four memory modules 903, on each of two memory busses 506 (a downstream memory bus 906 with 24 wires and an upstream memory bus 902 with 25 wires), connected to the memory controller 910 in either a direct or cascaded manner. The memory module 903 next to the memory controller 910 is connected to the memory controller 910 in a direct manner. The other memory modules 903 are connected to the memory controller 910 in a cascaded manner. Although not shown in this figure, the memory controller 910 may be integrated into a processor and may connect to more than one memory bus 906 as depicted in FIG. 5.

As depicted in FIG. 9, the DIMMs 903 are interconnected in a daisy chain manner. The downstream memory bus 904 is comprised of twenty-two single-ended signals and a differential clock pair. The downstream memory bus 904 is used to transfer address, control, data and error correction code (ECC) bits downstream from the memory controller 910, over several clock cycles, to one or more of the memory modules 903 installed on the cascaded memory channel. The upstream memory bus 902 is comprised of twenty-three single-ended signals and a differential clock pair, and is used to transfer bus-level data and ECC bits upstream from the sourcing memory module 903 to the memory controller 910. Using this memory structure, and a four to one data rate multiplier between the DRAM data rate (e.g., 400 to 800 Mb/s per pin) and the unidirectional memory bus data rate (e.g., 1.6 to 3.2 Gb/s per pin), the memory controller signal pincount, per memory channel, is reduced from approximately one hundred and twenty pins to about fifty pins.

Figure 10:
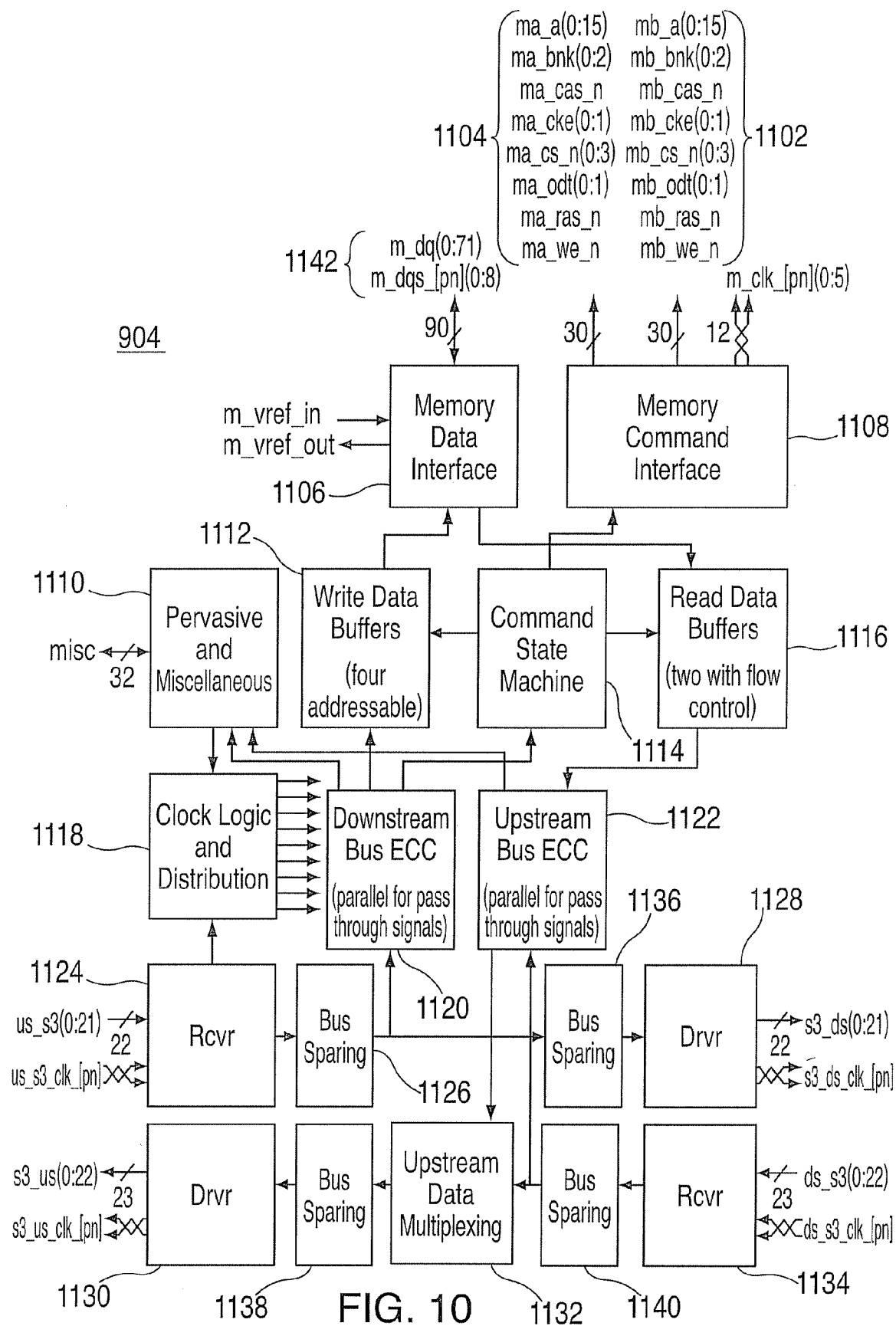
FIG. 10 is a block diagram of the high-level logic flow of the hub device located on a memory module that may be utilized by the current generation memory system.

FIG. 10 is a block diagram of the high-level logic flow of the hub device 904 located on a memory module 903 that may be utilized by the current generation memory system. The blocks in the lower left and right portions of the drawing (1124, 1128, 1130, 1134) are associated with receiving or driving the high-speed bus 906 depicted in FIG. 9. The upstream bus 902 passes information in the direction of the memory controller 910, and the downstream bus 906 passes information away from the memory controller 910.

Referring to FIG. 10, data, command, address, ECC, and clock signals from an upstream memory assembly (i.e., a memory module 903) or a memory controller 910 are received from the downstream memory bus 904 into a receiver module 1124. The receiver functional block 1124 provides macros and support logic for the downstream memory bus 904 and, in an exemplary embodiment of the present invention includes support for a twenty-two bit, high speed, slave receiver bus. The receiver functional block 1124 transmits the clock signals to a clock logic and distribution functional block 1118 (e.g., to generate the four to one clock signals). The clock logic and distribution functional block 1118 also receives data input from the pervasive and miscellaneous signals 1110. These signals typically include control and setup information for the clock distribution PLL's, test inputs for BIST (built-in self-test) modes, programmable timing settings, etc. The receiver functional block 1124 transfers the data, command, ECC and address signals to a bus sparing logic block 1126 to reposition, when applicable, the bit placement of the data in the event that a spare wire utilized during the transmission from the previous memory assembly. In an exemplary embodiment of the present invention, the bus sparing logic block 1126 is implemented by a multiplexer to shift the signal positions, if needed. Next, the original or re-ordered signals are input to another bus sparing logic block 1136 to modify, or reorder if necessary, the signal placement to account for any defective interconnect that may exist between the current memory assembly and a downstream memory assembly. The original or re-ordered signals are then input to a driver functional block 1128 for transmission, via the downstream memory bus 904, to the next memory module 806 in the chain. In an exemplary embodiment of the present invention, the bus sparing logic 1136 is implemented using a multiplexer. The driver functional block 1128 provides macros and support logic for the downstream memory bus 904 and, in an exemplary embodiment of the present invention, includes support for the twenty-two bit, high speed, low latency cascade bus drivers.

In addition to inputting the original or re-ordered signals to the bus sparing logic 1136, the bus sparing logic 1126 also inputs the original or re-ordered signals into a downstream bus ECC functional block 1120 to perform error detection and correction for the frame. The downstream bus ECC functional block 1120 operates on any information received or passed through the multi-mode buffer device 1002 from the downstream memory bus 904 to determine if a bus error is present. The downstream bus ECC functional block 1120 analyzes the bus signals to determine if it they are valid. Next, the downstream bus ECC functional block 1120 transfers the corrected signals to a command state machine 1114. The command state machine 1114 inputs the error flags associated with command decodes or conflicts to a pervasive and miscellaneous functional block 1110. The downstream and upstream modules also present error flags and/or error data (if any) to the pervasive and miscellaneous functional block 1110 to enable reporting of these errors to the memory controller, processor, service processor or other error management unit.

Referring to FIG. 10, the pervasive and miscellaneous functional block 1110 transmits error flags and/or error data to the memory controller 910. By collecting error flags and/or error data from each memory module 903 in the chain, the memory controller 910 will be able to identify the failing segment(s), without having to initiate further diagnostics, though additional diagnostics may be completed in some embodiments of the design. In addition, once an installation selected threshold (e.g., one, two, ten, or twenty) for the number of failures or type of failures has been reached, the pervasive and miscellaneous functional block 1110, generally in response to inputs from the memory controller 910, may substitute the spare wire for the segment that is failing. In an exemplary embodiment of the present invention, error detection and correction is performed for every group of four transfers, thereby permitting operations to be decoded and initiated after half of the eight transfers, comprising a frame, are received. The error detection and correction is performed for all signals that pass through the memory module 903 from the downstream memory bus 904, regardless of whether the signals are to be processed by the particular memory module 903. The data bits from the corrected signals are input to the write data buffers 1112 by the downstream bus ECC functional block 1120.

The command state machine 1114 also determines if the connected signals (including data, command and address signals) are directed to and should be processed by the memory module 903. If the corrected signals are directed to the memory module 903, then the command state machine 1114 determines what actions to take and may initiate DRAM action, write buffer actions, read buffer actions or a combination thereof. Depending on the type of memory module 903 (buffered, unbuffered, registered), the command state machine 1114 selects the appropriate drive characteristics, timings and timing relationships. The write data buffers 1112 transmit the data signals to a memory data interface 1106 and the command state machine 1114 transmits the associated addresses and command signals to a memory command interface 1108, consistent with the specification for the memory module type (buffered, unbuffered, registered), such as the exemplary prior generation DIMM described herein.

The memory command interface 1108 includes programmable timing circuitry to enable memory device timings to be met whether the devices are directly attached to the hub, or attached indirectly via one or more modules connected to the hub/adapter assembly as described herein and in U.S. Patent Publication Number U.S. 2006/0136618A1 to Gower et al., of common assignment herewith and incorporated herein by reference in its entirety. Unbuffered memory modules, which do not include re-drive or address, control and/or command data, will generally be operated with timings similar to those of direct-attached memory devices; however drive strengths on the memory command interface 1108 may be adjusted, as well as timing relationships between signals and/or signal groupings, based on the unbuffered module type (e.g. the memory device count). Registered memory modules generally include re-drive on one or more of address, control and command signals (shown as two sets of signals, 1102 and 1104, to enable connection to one or two independent memory busses, modules or memory ranks), thereby generally requiring a lower drive strength from the memory command interface 1108, but may require a shift in one or more of the address, control and command timings relative to data due to the re-drive delay on these one or more signals on the registered DIMM.

The memory command interface 1108, therefore, includes one or more of additional programmable drive strength, terminations, programmable timings (signal output times relative to clock) and clock relationships (signals may be sent on different clock boundaries) such that a wide range of memory device attachment methods (directly and indirectly attached to the command interface) can be supported. The memory clocks are also forwarded to the attached memory devices and/or modules via the 6 differential clock pairs (12 wires) from the memory command interface 1108, thereby enabling the memory command interface 1108 to correctly reference all output signals to the memory (and memory register) clocks. Similarly, the memory data interface 1106 reads from and writes memory data 1142 to directly attached memory device(s) 909 and/or to one or more memory modules 903. As with the memory command interface 1108, the memory data interface 1106 includes one or more of programmable drive strength, terminations, programmable timings (signal output times relative to clock) and clock relationships (signals may be sent on different clock boundaries, relative to the clocks sourced from memory command interface 1108) such that a wide range of memory device attachment methods (directly and indirectly attached to the command interface) can be supported. With the exemplary interface programmability included in the memory data interface 1106 and memory command interface 1108, the exemplary hub device 904 offers a single device and/or package solution which can be used on a module as part of a memory subsystem, on an adapter card to connect to one or more attached memory modules, as an interface device (on a system board or card) to adapt a packetized, multi-transfer interface to an alternate parallel interface, such as a multi-drop, fly-by or other memory interface, etc.

In an alternate exemplary embodiment of a current generation DIMM, the memory devices 909 attached to the DIMM are four bit devices. In this case the logic flow of the hub device 904 depicted in FIG. 10 remains the same except that the number of signals are modified where required to accommodate the use of four bit memory devices and to improve operability and diagnostic capability. For example, the memory device interface 1106 performs the same functions described previously except that it transmits and/or receives 108 signals rather than 90 due to the addition of 9 differential strobe pairs (18 total signals). In addition, the pervasive and miscellaneous functional block 1110 transmits and/or receives 38 signals but otherwise performs the same functions described previously. A selector may be provided in the hub device 904 to allow the hub device 904 to operate with four bit devices and/or eight bit devices.

Data signals to be transmitted to the memory controller 910 may be temporarily stored in the read data buffers 1116 after a command, such as a read command, has been executed by the memory module 903, consistent with the memory device 'read' timings. The read data buffers 1116 transfer the read data into an upstream bus ECC functional block 1122. The upstream bus ECC functional block 1122 generates check bits for the signals in the read data buffers 1116. The check bits and signals from the read data buffers 1116 are input to the upstream data multiplexing functional block 1132. The upstream data multiplexing functional block 1132 merges the data on to the upstream memory bus 902 via the bus sparing logic 1138 and the driver functional block 1130. If needed, the bus sparing logic 1138 may re-direct the signals to account for a defective segment between the current memory module 903 and the upstream receiving module (or memory controller). The driver functional block 1130 transmits the original or re-ordered signals, via the upstream memory bus 902, to the next memory assembly (i.e., memory module 903) or memory controller 910 in the chain. In an exemplary embodiment of the present invention, the bus sparing logic 1138 is implemented using a multiplexer to shift the signals. The driver functional block 1130 provides macros and support logic for the upstream memory bus 902 and, in an exemplary embodiment of the present invention, includes support for a twenty-three bit, high speed, low latency cascade driver bus.

Data, clock and ECC signals from the upstream memory bus 902 are also received by any upstream multi-mode buffer device 1002 in any upstream memory module 903. These signals need to be passed upstream to the next memory module 903 or to the memory controller 910. Referring to FIG. 10, data, ECC and clock signals from a downstream memory assembly (i.e., a memory module 903) are received on the upstream memory bus 902 into a receiver functional block 1134. The receiver functional block 1134 provides macros and support logic for the upstream memory bus 902 and, in an exemplary embodiment of the present invention includes support for a twenty-three bit, high speed, slave receiver bus. The receiver functional block 1134 passes the data and ECC signals, through the bus sparing functional block 1140, to the upstream data multiplexing functional block 1132 and then to the bus sparing logic block 1138. The signals are transmitted to the upstream memory bus 902 via the driver functional block 1130.

In addition to passing the data and ECC signals to the upstream data multiplexing functional block 1132, the bus sparing functional block 1140 also inputs the original or re-ordered data and ECC signals to the upstream bus ECC functional block 1122 to perform error detection and correction for the frame. The upstream bus ECC functional block 1122 operates on any information received or passed through the multi-mode buffer device 1002 from the upstream memory bus 902 to determine if a bus error is present. The upstream bus ECC functional block 1122 analyzes the data and ECC signals to determine if they are valid. Next, the upstream bus ECC functional block 1122 transfers any error flags and/or error data to the pervasive and miscellaneous functional block 1110 for transmission to the memory controller 910. In addition, once a pre-defined threshold for the number or type of failures has been reached, the pervasive and miscellaneous functional block 1110, generally in response to direction of the memory controller 910, may substitute the spare segment for a failing segment.

The block diagram in FIG. 10 is one implementation of a multi-mode buffer device, or hub device 904 that may be utilized by exemplary embodiments of the present invention. Other implementations are possible without departing from the scope of the present invention.

Figure 11:
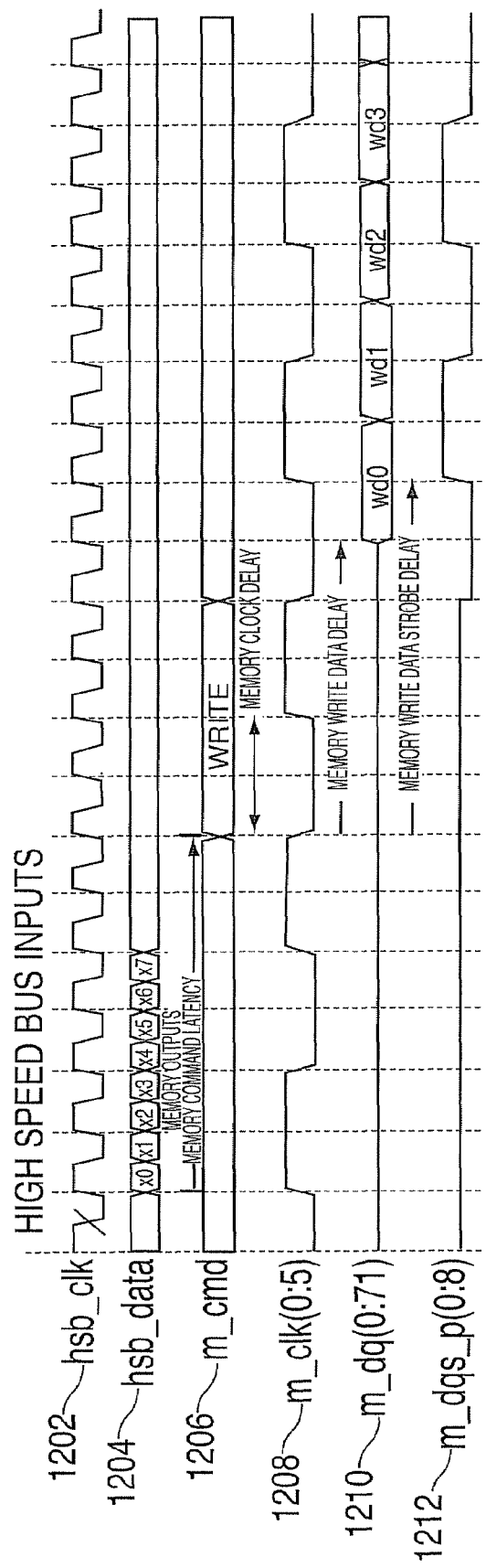
FIG. 11 depicts bus and SDRAM timing diagrams showing the four to one bus speed multiplier that is utilized by an exemplary embodiment of the current generation memory subsystem.

FIG. 11 depicts bus and SDRAM timing diagrams showing the four to one bus speed multiplier that is utilized by exemplary embodiments of the current generation memory subsystem. FIG. 11 is a simplified "write" timing diagram that demonstrates the bus timing relationships for a write cycle in the preferred embodiment. The same approach may be taken for other cycles, such as a read cycle. The high-speed bus clock (hsb_clk) 1202 is the notation for the positive side of the differential clock that travels with the high speed data traveling downstream from the memory controller 910 to the first memory module 903, or DIMM 903. Even though the hsb_clk 1202 is shown as being single-ended, in exemplary embodiments of the present invention, a differential clock is utilized to reduce clock sensitivity to external noise and coupling. The high speed data signal (hsb_data) 1204 shows a burst of eight transfers, operating at a double data rate speed (i.e., data is valid on both edges of the clock), which in this example constitutes a single frame of address, command and data to the first memory module 903 position. With the aforementioned downstream bus width of twenty-two bits, and the burst of eight, a full frame can constitute up to one hundred and seventy-six unique bits, depending on the assignment or use of these bits and the actual wires on the bus. Thus, the data is packetized with each packet, or frame, containing the contents of multiple transfers (e.g., eight bursts).

Also as shown in FIG. 11, the eight bursts occur over four of the hsb_clk cycle times, at which point this example shows no further activity on the high speed bus. The local memory clock (m_clk) 1208 on the memory module 903 is derived from the hsb_clk 1202, and is shown as a single-ended signal m_clk (0:5) operating at one quarter the frequency of the hsb_clk 1202. Although shown as a single-ended clock, in an exemplary embodiment of the present invention, the m_clk 1208 would also operate as a differential clock. The decoded memory command signifying a 'write' operation to the memory devices 909 (e.g., double data rate (DDR2) memory devices, or SDRAMS) on the memory module 903, is shown on the signal labeled m_cmd 1206. This command is decoded from the high-speed bus 906 and is driven by the hub device 904 to the memory devices 909 to ensure arrival at the memory devices 909 prior to the rising edge of the clock at the memory devices 909. The seventy-two bits of data written to the memory devices 909 is shown as m_dq(0:71) 1210, and is shown arriving at the memory devices 909 one full memory clock after the write command is decoded, as a DDR signal relative to the m_clk 1208. In an exemplary embodiment of the present invention, the data, or m_dq(0:71) 1210 is single ended. The nine DDR data strobes (m_dqs_p) 1212 are also shown, as single ended signals, switching one quarter of a clock cycle prior to the data bus for the memory devices 909, thereby ensuring that the strobe switches approximately in the center of each valid write data bit. In an exemplary embodiment of the present invention, the m_dqs_p 1212 is differential. This diagram demonstrates a burst of four data bits to the memory devices 909 (wd0 through wd3), with seventy-two bits of memory data being provided to the memory devices every memory clock cycle. In this manner, the data rate of the slower memory modules 903 is matched to the high-speed memory bus 906 that operates at four times the speed of the memory modules 903. In this manner, the packetized multi-transfer interface of the high-speed memory bus 906 utilized by the current generation memory system is converted into a parallel interface for a lower speed bus utilized by the memory devices 909.

FIG. 12 depicts an exemplary downstream frame format (or packet format) that may be utilized by the current generation memory system to transfer information downstream from the memory controller 910 to the memory modules 903 in a packetized manner. The downstream frame consists of eight transfers, with each transfer including twenty-two signals and a differential clock (twenty-four wires total). The frame further consists of eight command wires (c0 through c7) 1308, nine data wires (di0 through di8) 1306, four bus ECC (Error Correcting Code) wires (ecc0 through ecc3) 1304 and a spare wire (spare) 1302. The seventy-two data bits referenced in the timing diagram of FIG. 11 are shown in FIG. 12 as bits di0 through di8, and consist of nine wires with eight transfers on each wire for each frame. The numbering of each data bit, as well as for other bits, is based on the wire used as well as the specific transfer. D34 refers to data bit 3 (of bits 0 through 8) and transfer 4 (of transfer 0 through 7). The command bit field is shown as c0 through c7, and consists of sixty-four bits of information provided to the module over eight transfers. The ECC bit field (ecc0 through ecc3) consists of thirty-two bit positions over eight transfers, but is actually formatted in groups of sixteen bits. Each sixteen bit packet consists of four transfers over each of the four wires, and provide the bus level fault detection and correction across each group of 4 bus transfers. The spare bit position may be used to logically replace any of the twenty-one wires, also defined as bitlanes, used to transfer bits in the command, data and ECC fields, should a failure occur in one of those bitlanes that results in errors that exceed a system-assigned failure threshold limit. Using this exemplary embodiment of the present invention, provides that out of the one hundred and seventy-six possible bit positions, one hundred and sixty-eight are available for the transfer of information to the memory module 806, and of those one hundred and sixty-eight bit positions, thirty-two bit positions are further assigned to providing ECC protection on the bus transfers themselves, thereby allowing a total of one hundred and thirty-six bit positions to be used for the transfer of information to the memory module 903. The frame format depicted in FIG. 12 is meant to be an example, as other frame formats may also be utilized depending, for example, on the type of information being transferred. In addition, one or both of the command and data signals (or bits) may contain address signals (or bits).

FIG. 13 (including FIGS. 13A and 13B) is a table illustrating a functional pin layout of an exemplary 276-pin DIMM that may be utilized by the current generation memory system. In addition to the layout and approximate distance (millimeters) from the key of each pin, FIG. 13 also provides a functional description of each of the pins, including those used as redundant pins and those used for special control functions. Those pins that are used as redundant pins are designated in FIG. 13 using the suffix "_r". As indicated previously, designated pins 1-138 run from left to right on the front side of the DIMM, with pins 139-276 located behind pins 1-138 when viewing the front side of the DIMM.

In an exemplary embodiment, each of the redundant pins is located behind the respective primary function pin for which it is redundant. For example, redundant service pins serv_ifc(1)_r and serv_ifc(2)_r (pins 142, 143) are located directly behind service pins serv_ifc(1) and serv_ifc(2) (pins 4, 5), respectively. In this manner, the DIMM is resistant to single point-of-fail memory outage (e.g., such as if the DIMM were warped or tilted toward one side or the other).

Among the various functions included within the 276-pin layout are a pair of continuity pins (1, 138) and scope trigger pins (3, 141). As will be appreciated from an inspection of the pin assignment table in FIG. 13, as opposed to arranging the pins in a conventional layout (where each group of similarly functioning pins are located in the same section of the DIMM), the exemplary embodiment uses a placement where the center region is used for two of the four high-speed busses (s3_us, Output: DIMM to upstream DIMM or to Memory Controller) and (ds_s3, DIMM to upstream DIMM (input)). The other two high-speed busses are each split in half, wherein half of each bus (us_s3, controller or DIMM to DIMM (input) and s3_ds, DIMM to downstream DIMM (output)), with approximately half the signals for each bus placed on either end of the center region pin locations. With the buffer device placed close to the center of the module, the variability in wiring length for each pin in both the center and outer regions may be reduced.

As will also be noted from FIG. 13, the pin layout provides for power at both a first voltage level (e.g., 1.8 volts) and a second voltage level (e.g., 1.2 volts, as shown at pins 75, 213, 79, 217). In this manner, the logic portion of the system may be operated independent of and/or prior to powering up the main memory portion of the system, thereby providing additional system memory usage flexibility and/or power savings.

The pin layout in FIG. 13 is an example, and as is known in the art other pin arrangements may be utilized to perform the functions associated with the current generation memory system. For example, FIG. 14 depicts another pin layout that may be utilized by a current generation memory system. FIG. 14 (including FIGS. 14A, 14B, and 14C) is a table illustrating a functional pin layout of an exemplary 276-pin DIMM. In addition to the layout and approximate distance (millimeters) from the key of each pin, FIG. 14 also provides a functional description of each of the pins, including those used as redundant pins and those used for special control functions. Those pins that are used as redundant pins are designated in FIG. 14 using the suffix "_r". As indicated previously, designated pins 1-138 run from left to right on the front side of the DIMM, with pins 139-276 located behind pins 1-138 when viewing the front side of the DIMM. As depicted in FIG. 14, each of the redundant pins is located behind the respective primary function pin for which it is redundant. For example, redundant FRU (field replaceable unit) service interface pins fsi0_data_r and fsi1_data_r (pins 199, 200) are located directly behind FRU service interface pins fsi0_data and fsi1_data (pins 61, 62), respectively. In this manner, the DIMM is resistant to single point-of-fail memory outage (e.g., such as if the DIMM were warped or tilted toward one side or the other).

Among the various functions included within the 276-pin layout depicted in FIG. 14 are a pair of scope trigger pins (3, 141), a vref (voltage) test pin (2) and fault (error) pins (4, 142). As will be appreciated from an inspection of the pin assignment table in FIG. 14, the signal pins (also referred to as "high-speed bus interface pins") associated with each of the four high-speed busses are grouped on one side (to the left or right) of a midpoint (with respect to the length) of the DIMM, with either a signal voltage (e.g. 1.2V) or ground pin included between each two high-speed signals (or high-speed bus interface pins). Having all of the high-speed bus interface pins associated with a single high-speed bus located on one side of the card with respect to the midpoint of the length of the card and having a voltage or ground pin included between each of the high-speed bus interface signals will lead to an improvement in signal integrity and module operating frequency.

As will also be noted from FIG. 14, the pin layout depicted provides for power at both a first voltage level (e.g., 1.8 volts) and a second voltage level (e.g., 1.2 volts, as shown at pins 54, 191, 80 and 217). In this manner, the logic portion of the system may be operated independent of and/or prior to powering up the main memory portion of the system, thereby providing additional system memory usage flexibility and/or power savings.

Figure 15:
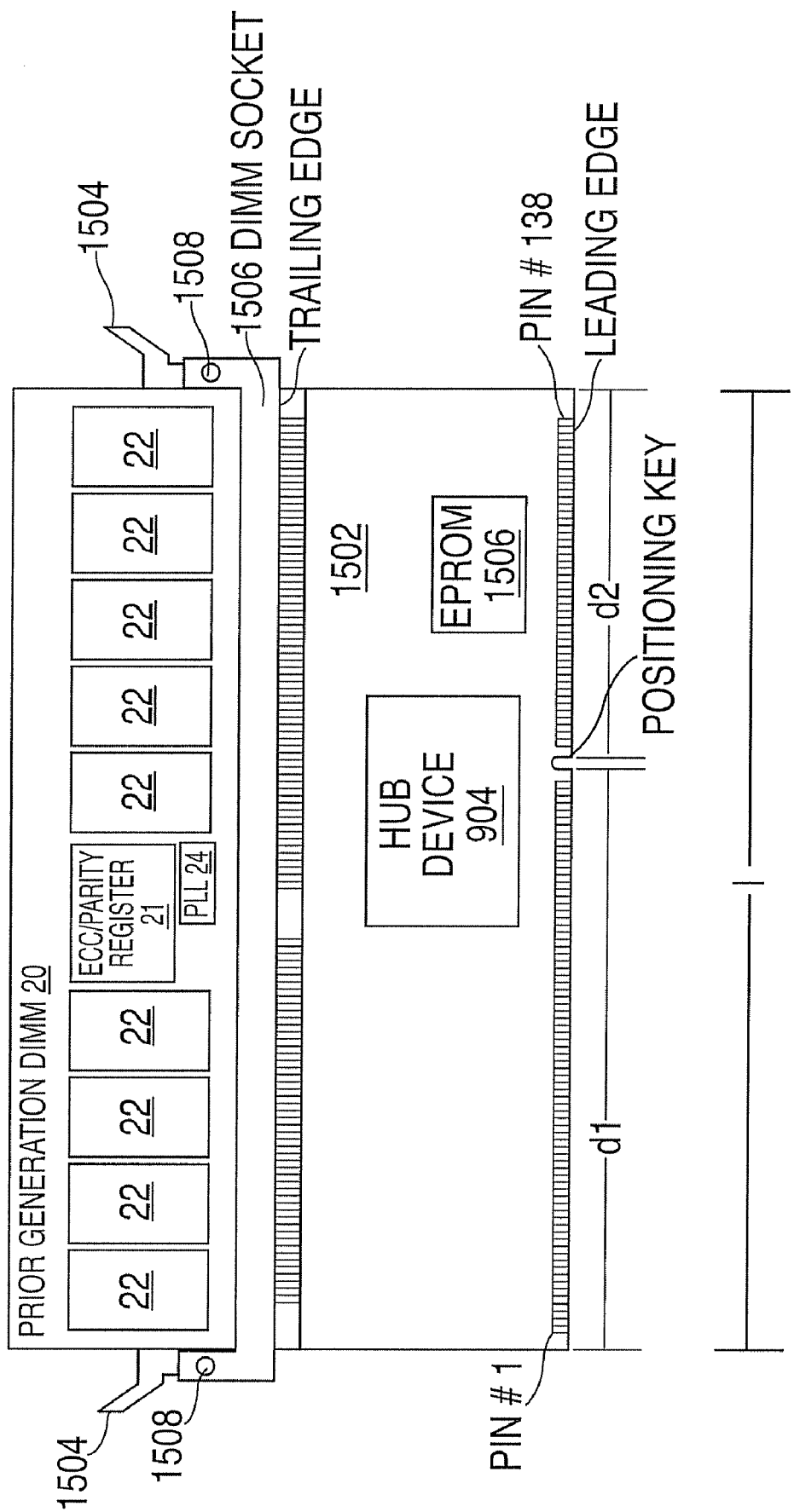
FIG. 15 depicts an exemplary adapter card that may be utilized by an exemplary embodiment to allow a prior generation DIMM to be utilized in a current generation memory system.

FIG. 15 depicts an exemplary adapter card 1502 that may be utilized by exemplary embodiments to allow a prior generation DIMM 20 to be utilized in a current generation memory system. The adapter card or board 1502, which has an approximate width of the current generation memory module 903, thereby allowing insertion into the current generation memory socket, and includes a 276 pin configuration and pin assignment on the leading edge that is consistent with the current generation memory modules 903 such as the pinouts described in reference to FIGS. 13 and 14. The adapter board 1502 further includes a DIMM socket 1506, attached to the edge of the adapter board 1502 opposite the leading edge, with the DIMM socket 1506 having 276 pin contacts to enable the insertion and operation of a prior generation 276 pin DIMM with pinouts such those described in reference to FIG. 8.

As is also shown in FIG. 15, the location of a positioning key (notch) is specifically shifted from the midpoint of the length, 1, of the adapter card 1502 (with respect to prior generation modules) in order to ensure the DIMM cannot be fully inserted into a connector intended for a different module type. In addition, the positioning key location also prevents reverse insertion of the DIMM, and allows for a visual aid to the end-user regarding proper DIMM insertion. In the example illustrated, the positioning key is located between pins 80/218 and 81/219. As such, the distance $d_1$ along the length, 1, of the adapter card 1502 is larger than the distance $d_2$. In an exemplary embodiment, the length of the leading edge of the adapter card 1502 is between 149 and 153 millimeters (mm).

The exemplary embodiment depicted in FIG. 15 further includes the hub device 904 described previously, and commonly referred to as an "interface device", a memory "hub", "buffer" or "memory interface device", which is adapted to convert the high speed/narrow I/O daisy chain bus(es) in the current generation of memory systems to the required signals, interfaces, timings and functionality required to enable system operation with the lower speed, legacy memory module 20. In addition, the exemplary adapter card 1502 includes one or more storage mechanisms 1506 (such as EPROM devices, EEPROM devices, jumpers, registers or other volatile or non-volatile storage means), as well as resistors, capacitors and other devices to enable the operation of the buffer device and both interfaces consistent with the required component and bus specifications.

The adapter card 1502 is wider at the top near the DIMM socket 1506 to make the adapter card 1502 more rigid. In addition, the adapter card 1502 may include such retention devices as two or more pins 1508 holding the DIMM socket 1506 onto the adapter card 1502. This allows for good physical connection between the DIMM socket 1506 and the adapter card 1502. Further, the DIMM socket or connector 1506 on adapter card 1502 depicted in FIG. 15 uses retention latches or clips 1504 to deep the legacy DIMM 20 in place.

The exemplary embodiment is further designed such that the storage mechanism 1506 (e.g., an EPROM) on the adapter card 1502 is programmed such that a given adapter card 1502 can be pre-configured to operate with one or more previous generation memory modules, such as those having memory densities of 2 GB, 4 GB, 8 GB or 16 GB and supporting data rates of 400, 533 or 667 Mb/s, produced with x4, x8 or other data width devices. Although the exemplary embodiment is designed such that 5 module configurations/speed grade combinations are supported, representing the most widely utilized modules, other adapter cards 1502 may be produced supporting one or more of these or other module types, subject to the functionality of the hub device 904. An exemplary embodiment further facilitates the correspondence of the appropriate adapter card 1502 and legacy DIMM 20 through the use of symbols (such as a square, triangle, circle, etc) etched or printed on both the adapter card 1502 and the memory card and/or system board into which the legacy DIMM was previously installed, or on the DIMM 20 itself. Other correspondence methods include the use of colors, identification numbers or other visual or electrically readable aids which permit the correct matching of adapter cards 1502 and legacy, or previous generation DIMMs.

An exemplary embodiment of the adapter card 1502, as described above, may be configured to use one or more of the supported previous generation memory modules during production of the adapter card 1502, during testing and/or configuration of the adapter card 1502, during initial configuration of the system at the customer location (via a local programming means), or at a later time—as the need arises to re-use one or more legacy modules (e.g. increased system memory demands, availability of additional legacy modules, possibly through the removal of a prior art system, etc).

Further exemplary embodiments are possible wherein the adapter card 1502 is configured by the system in which the adapter card 1502 (and legacy DIMM 20) is installed, and wherein the system detects the installed adapter card 1502 and the installed legacy DIMM 20 (e.g. through the use of a common I2C or JTAG interface which connects to both the adapter circuitry and the legacy module) and configures the adapter card 20 based on the adapter card type and legacy DIMM 20, as well as the inclusion of circuitry in the hub device 904 or on the adapter card 1502 that self-configures the adapter card 1502 based on the legacy DIMM 20 installed (e.g. via a POR (power-on-reset) operation or subsequent self-initiated interrogation of the non-volatile storage located on the legacy module). In an exemplary embodiment, a visual means is preferred as a means of reducing the cost and complexity of enabling the use of prior generation (e.g. legacy) or contemporary (e.g. DDR2 registered memory) memory modules, as well as ensuring that a visual inspection is included in the process; thereby adding an additional means of ensuring that the DIMM being proposed for re-utilization offers an adequate level of reliability (e.g. includes fault tolerant attributes such as ECC on the address/command interface, redundant I/O on signals that are not otherwise protected by ECC, etc) in the current generation system environment.

In an exemplary embodiment, a high degree of fault tolerance is retained while using the legacy modules 20, by enabling ECC across the address and command interface, between the hub device 904 on the adapter card 1502 and the legacy memory module 20. In addition, the adapter card 1502 includes connections to each of the redundant interface pins on those signal and power pins that do not otherwise include ECC protection and/or multiple pins, thereby minimizing the risk of failure due to poor electrical contact between the adapter card 1502 and the DIMM connector 1504 (e.g. due to a poor solder or conductive adhesive joint), the DIMM connector 1504 and the legacy DIMM 20 (e.g. due to a low pressure contact, non-conductive material impeding electrical connection, periodic disconnects due to vibration, etc) and/or other wiring faults and interconnects (wire breaks, shorts, poor device interconnection joints, intermittent connections, etc). In an exemplary embodiment, the ECC utilized with the address and/or command bus permits continuous operation of the legacy memory module 20 independent of the existence of errors during the transfer of the address and/or command information. An exemplary embodiment further includes support for the reading and writing of data to the legacy module 20, with such data often including ECC data, such that errors related to the original data can be identified and corrected (this ECC function is generally implemented at the memory controller or processor, with the data and ECC bits stored in the memory subsystem(s)).

An exemplary embodiment still further retains reliability innovations included in the packetized high speed/narrow I/O bus structure of the current generation memory systems, including bus-level ECC on the upstream and downstream busses as described in U.S. Patent Publication Number U.S. 2006/0107175A1 to Dell et al., of common assignment herewith and incorporated herein by reference in its entirety. In addition, an exemplary embodiment also retains bitlane sparing functions as described in U.S. Patent Publication Number U.S. 2006/0036827A1 to Dell et al., of common assignment herewith and incorporated herein by reference in its entirety. Retaining these reliability innovations allows for providing a memory re-use solution that includes additional reliability enhancements, resulting in improved overall memory reliability relative to the prior generation memory systems in conjunction with the legacy memory module 20. This innovative memory solution therefore results in a higher degree of reliability than was available in the prior generation memory system, even when the prior generation (legacy) memory module 20 is installed in the current generation memory system in conjunction with the exemplary adapter card 1502.

As described in FIG. 10, the hub device 904 in an exemplary embodiment includes programmable features to permit direct connection to memory devices installed on the same carrier as the hub device 904, as well as to connect to memory devices and/or other re-drive devices located on one or more memory modules located separate from and/or independent of the carrier to which the hub device 904 is attached. The programmable features include one or more of programmable drive strengths on the output drivers, programmable interface levels (to accommodate interfaces having differing voltage levels), programmable timing relationships (interface timings relative to the interface clock), programmable propagation delays (permitting various signal groupings to be sent on different clock boundaries relative to other signal groupings, e.g. to permit connection to a DIMM having a portion of the inputs re-driven through a register which adds one or more clock delays), etc. Other programmable features include support for various memory device data widths and addressing (e.g. support for memory structures configured with x4, x8 and/or x16 devices, as well as multiple device densities) and device speed grades. In an exemplary embodiment, the hub device 904 is further operable with DDR2 and DDR1 memory devices, with the DDR1 devices generally located on a separate memory module and including a local register (or re-drive device) for buffering one or more of address, command and control inputs.

Although the registered DIMMs attached to the adapter are described as 'legacy' DIMMs 20, the modules may be comprised of current generation memory devices, and may include or not include other devices such as registers, non-volatile memory devices or other semiconductor devices that affect one or more of the address, command, control, data, error and/or other communication interfaces. The innovative adapter card 1502 described herein is designed such that any memory module having a pin-compatible interface, compatible physical dimensions and a parallel bus which is operable with the parallel interface on the hub device 904 may be adapted to operate in the packetized memory structure.

In exemplary embodiments, the specialty pins on the previous generation memory module 20 are connected to the adapter card pins as follows. Note that the register pins on the legacy DIMM 20 are connected directly to the DIMM tabs, so that connections described below are to be made on the adapter card 1502.

CS Gate Enable (DIM pins 9 and 147): Tied to and on the adapter card 1502

ECC Mode (DIMM pins 7 and 145): Tied to VDD on the adapter card 1502-DLY CKE/ODT (DIMM pins 8 and 146): Tied to Gnd on the adapter card 1502-Reset (DIMM pins 40 and 178): Tied to VDD on the adapter card 1502

CB0-7 (8 DIMM pins, per pinout table): Connect to the hub device 904 on the adapter card 1502

UE (DIMM pins 4 and 142): Connect to the hub device 904 on the adapter card 1502

CE (DIM pins 5 and 143): Connect to the hub device 904 on the adapter card 1502

Figure 16:
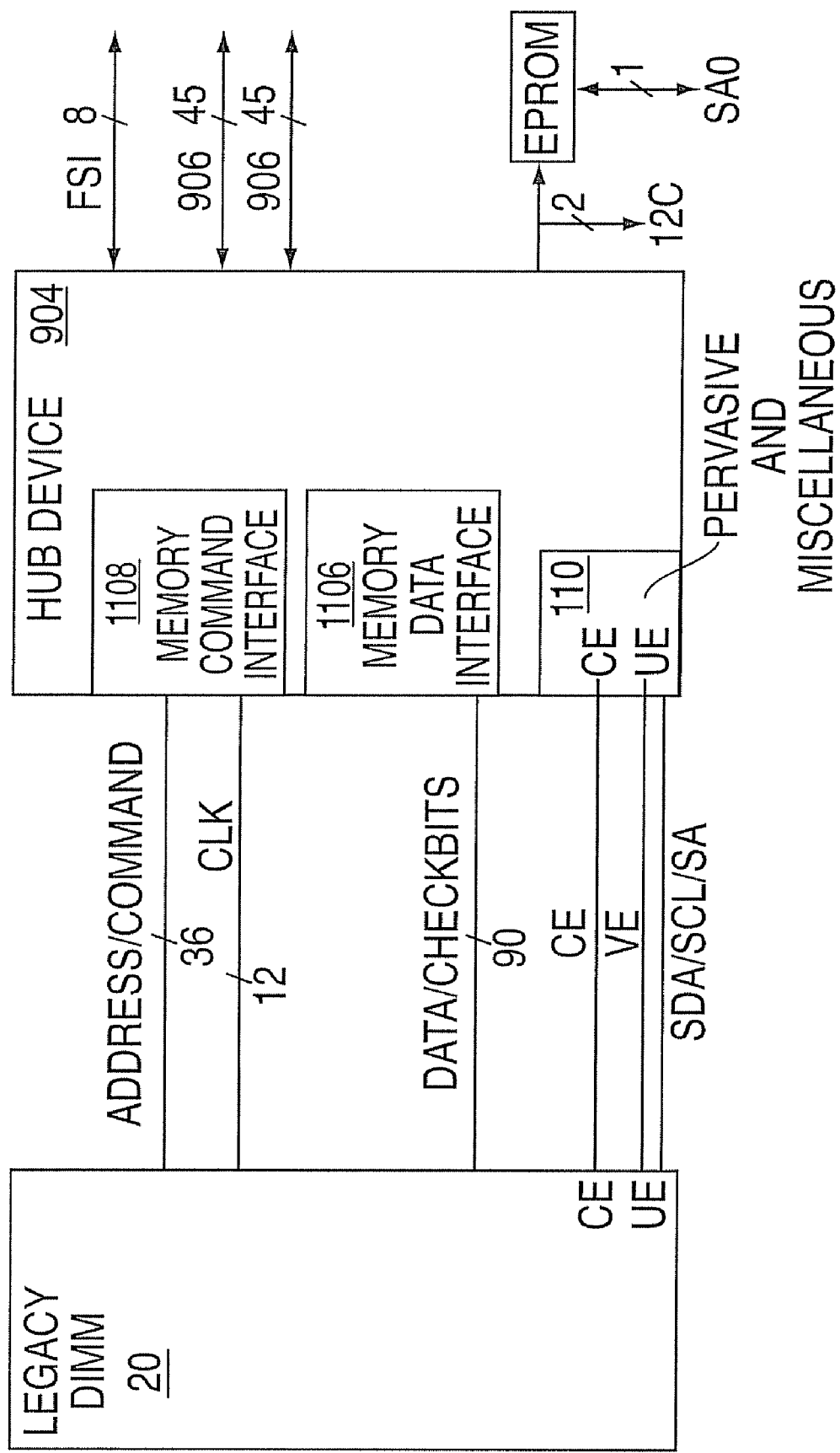
FIG. 16 is a block diagram of an exemplary interconnection between the hub device located on the adapter card and a legacy DIMM plugged into the DIMM socket on the adapter card.

FIG. 16 is a block diagram of an exemplary interconnection between the hub device 904 located on the adapter card 1502 and the legacy DIMM 20 plugged into the DIMM socket 1504, and includes key signal groupings. In exemplary embodiments, the hub device 904 communicates to the legacy DIMM via its parallel interface described previously in reference to FIGS. 11 and 12. As depicted in FIG. 11, the hub device 904 converts back and forth between the parallel interface required by the ECC/register device 21, PLL 24 and memory devices 909 and the packetized interface required by the narrow high-speed bus 906 utilized by the current generation memory systems. Thus, as depicted in FIG. 16, and further described in FIG. 10, the memory data signals 1142 to/from the memory data interface block 1106 correspond to the data and check bits received by/transmitted to the legacy DIMM 20. In addition, the command data signals 1102 1104 to/from the memory command interface block 1108 correspond to the address and command bits received by/transmitted to the legacy DIMM 20. The error lines from the legacy DIMM are further connected to the pervasive and miscellaneous block 1110, where they are interrogated and can be re-driven to the memory controller and/or processor by the hub device if an error is identified during operation of the legacy module. Although reduced function might also be provided in some applications, the exemplary hub device and adapter card 1502 are interconnected to the interface of the legacy DIMM such that all critical legacy DIMM functionality (addressing, command, clocks, data, error and configuration information (via the EEPROM interface pins on the legacy DIMM)) are available to the hub/adapter assembly, such that a very high degree of fault-tolerance can be achieved with the combined DIMM adapter assembly. This may result in improved fault tolerance exceeding that of the legacy DIMM in the original system.

As described previously, the pinout for the current memory module is utilized for the pin assignments on the leading edge (bottom) of the adapter card 1502. Additionally, the pinout for the previous generation DIMM 20 is utilized to connect to the DIMM socket 1504 to the adapter card 1502.

The hub device 904 is installed on the adapter card 1502, with appropriate support devices, (resistors, capacitors and other necessary components) to enable operation at the desired operating speeds. In addition, the adapter card 1502 includes a storage mechanism 1506 (either as an EEPROM, in the hub device 904 or in some other form) that provides information to the memory controller (or processor or other memory interface device) regarding the operating characteristics of the memory structure (in the exemplary embodiment, the adapter card 1502 plus the installed legacy or other memory module type that would otherwise be incompatible with the packetized interface into which the module is to be installed and used). The adapter card further includes a connector and necessary interconnect wiring to connect input and output signals to one or both of the two module interfaces (the adapter pins or the connector attached to the adapter). In exemplary embodiments, the pins will exit from the bottom of the DIMM socket 1504, and a subset of the pins will attach to each of the two sides of the adapter card 1502, preferably using solder joints. In an exemplary embodiment, the physical integrity and rigidity of the final assembly is achieved via a combination of such elements as the soldered connector, the retention latches for the legacy DIMM, the retention latches holding the adapter in the system DIMM socket, a pin or similar attachment to hold the connector on the adapter through the holes provided and one or more additional mechanical means—which may include foam or cushioning between the top of the legacy DIMM and the cover enclosing the entire memory system, mechanical supports on the bottom of the DIMM connector, clips located external to the final assembly, such as on the sides of the frame surrounding the memory system and/or other means.

Figure 17:
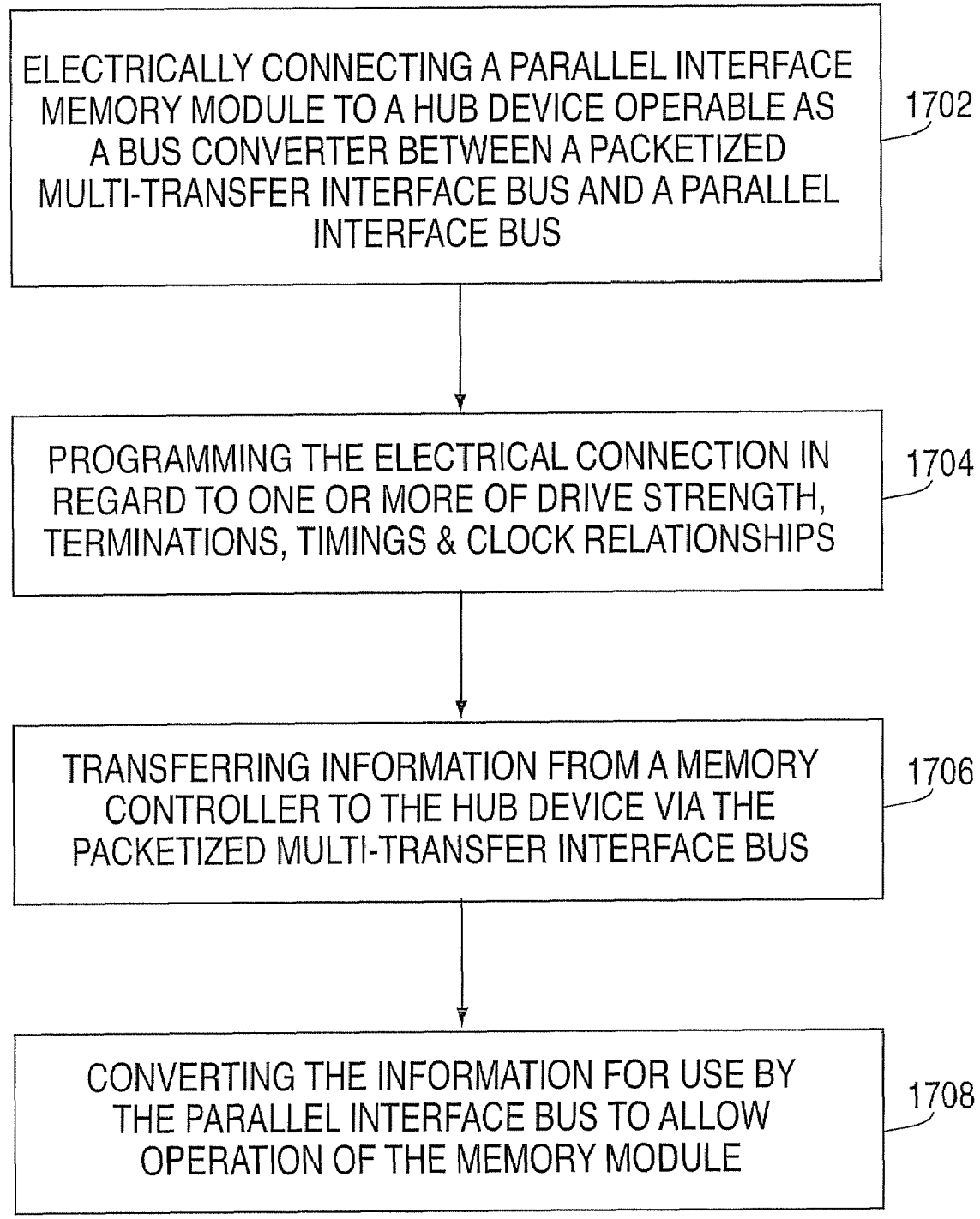
FIG. 17 depicts a process flow that may be implemented by an exemplary embodiment.

FIG. 17 depicts a process flow that may be implemented by an exemplary embodiment of the present invention as described herein. The process flow is a method for operating a memory module having a parallel interface on a packetized multi-transfer interface operating at a higher speed than the parallel interface. At block 1702, a parallel interface memory module (e.g., a previous generation memory module) is electrically connected to a hub device (e.g, hub device 904) operable as a bus converter between a packetized multi-transfer interface bus and a programmable parallel interface bus. The parallel interface bus provides one or more of address, command, data and clock signals in a manner that is compatible with the parallel interface module. In an exemplary embodiment, block 1702 includes having the prior generation DIMM 20 is inserted into the DIMM socket 1506 as depicted in FIG. 15. At block 1704, the characteristics of the electrical connection is programmed in regard to one or more of drive strength, terminations, timings and clock relationships to allow the hub device to support the specific parallel interface memory module being utilized. At block 1706, information is transferred from a memory controller or processor to the parallel interface memory module over the packetized multi-transfer interface bus using a downstream frame format comprising data bits which comprise one or more of address, command, control and memory data information depending on a frame type associated with the information. At block 1708, the information from the packetized, multi-transfer interface bus is converted into a format that is compatible with the memory module parallel interface bus to enable operation of the parallel interface memory module.

Exemplary embodiments include a computing system with a processor(s) and an I/O unit(s) (e.g., requesters) interconnected to a memory system that contains a memory controller and memory devices. In exemplary embodiments, the memory system includes a processor or memory controller interfaced to a set of hub devices (also referred to as "hub chips"). The hub devices connect and interface to the memory devices. In exemplary embodiments the computer memory system includes a physical memory array with a plurality of memory devices for storing data and instructions. These memory devices may be connected directly to the memory controller and/or indirectly coupled to the memory controller through hub devices. In exemplary embodiments, the hub-based computer memory system has memory devices attached to a communication hub device that is connected to a memory control device (e.g., a memory controller). Also in exemplary embodiments, the hub device is located on a memory module (e.g, a single substrate or physical device) that includes two or more hub devices that are cascaded interconnected to each other (and possibly to another hub device located on another memory module) via the memory bus.

Hub devices may be connected to the memory controller through a multi-drop or point-to-point bus structure (which may further include a cascade connection to one or more additional hub devices). Memory access requests are transmitted by the memory controller through the bus structure (e.g., the memory bus) to the selected hub(s). In response to receiving the memory access requests, the hub device translates the memory access requests to control the memory devices to store write data from the hub device or to provide read data to the hub device. Read data is encoded into one or more communication packet(s) and transmitted through the memory bus(ses) to the memory controller.

In alternate exemplary embodiments, the memory controller(s) may be integrated together with one or more processor chips and supporting logic, packaged in a discrete chip (commonly called a "northbridge" chip), included in a multi-chip carrier with the one or more processors and/or supporting logic, or packaged in various alternative forms that best match the application/environment. Any of these solutions may or may not employ one or more narrow/high speed links to connect to one or more hub chips and/or memory devices.

The memory modules may be implemented by a variety of technology including a DIMM, a single in-line memory module (SIMM) and/or other memory module or card structures. In general, a DIMM refers to a small circuit board which is comprised primarily of random access memory (RAM) integrated circuits or die on one or both sides with signal and/or power pins on both sides of the board. This can be contrasted to a SIMM which is a small circuit board or substrate composed primarily of RAM integrated circuits or die on one or both sides and single row of pins along one long edge. The DIMM depicted in FIG. 1 includes 168 pins in the exemplary embodiment, whereas subsequent DIMMs have been constructed with pincounts ranging from 100 pins to over 300 pins. In exemplary embodiments described herein, memory modules may include two or more hub devices.

In exemplary embodiments, the memory bus is constructed using multi-drop connections to hub devices on the memory modules and/or using point-to-point connections. The downstream portion of the controller interface (or memory bus), referred to as the downstream bus, may include command, address, data and other operational, initialization or status information being sent to the hub devices on the memory modules. Each hub device may simply forward the information to the subsequent hub device(s) via bypass circuitry; receive, interpret and re-drive the information if it is determined to be targeting a downstream hub device; re-drive some or all of the information without first interpreting the information to determine the intended recipient; or perform a subset or combination of these options.

The upstream portion of the memory bus, referred to as the upstream bus, returns requested read data and/or error, status or other operational information, and this information may be forwarded to the subsequent hub devices via bypass circuitry; be received, interpreted and re-driven if it is determined to be targeting an upstream hub device and/or memory controller in the processor complex; be re-driven in part or in total without first interpreting the information to determine the intended recipient; or perform a subset or combination of these options.

In alternate exemplary embodiments, the point-to-point bus includes a switch or bypass mechanism which results in the bus information being directed to one of two or more possible hub devices during downstream communication (communication passing from the memory controller to a hub device on a memory module), as well as directing upstream information (communication from a hub device on a memory module to the memory controller), often by way of one or more upstream hub devices. Further embodiments include the use of continuity modules, such as those recognized in the art, which, for example, can be placed between the memory controller and a first populated hub device (i.e., a hub device that is in communication with one or more memory devices), in a cascade interconnect memory system, such that any intermediate hub device positions between the memory controller and the first populated hub device include a means by which information passing between the memory controller and the first populated hub device can be received even if the one or more intermediate hub device position(s) do not include a hub device. The continuity module(s) may be installed in any module position(s), subject to any bus restrictions, including the first position (closest to the main memory controller, the last position (prior to any included termination) or any intermediate position(s). The use of continuity modules may be especially beneficial in a multi-module cascade interconnect bus structure, where an intermediate hub device on a memory module is removed and replaced by a continuity module, such that the system continues to operate after the removal of the intermediate hub device. In more common embodiments, the continuity module(s) would include either interconnect wires to transfer all required signals from the input(s) to the corresponding output(s), or be re-driven through a repeater device. The continuity module(s) might further include a non-volatile storage device (such as an EEPROM), but would not include main memory storage devices.

In exemplary embodiments, the memory system includes one or more hub devices on one or more memory modules connected to the memory controller via a cascade interconnect memory bus, however other memory structures may be implemented such as a point-to-point bus, a multi-drop memory bus or a shared bus. Depending on the signaling methods used, the target operating frequencies, space, power, cost, and other constraints, various alternate bus structures may be considered. A point-to-point bus may provide the optimal performance in systems produced with electrical interconnections, due to the reduced signal degradation that may occur as compared to bus structures having branched signal lines, switch devices, or stubs. However, when used in systems requiring communication with multiple devices or subsystems, this method will often result in significant added component cost and increased system power, and may reduce the potential memory density due to the need for intermediate buffering and/or re-drive.

Although not shown in the Figures, the memory modules or hub devices may also include a separate bus, such as a 'presence detect' bus, an I2C bus and/or an SMBus which is used for one or more purposes including the determination of the hub device an/or memory module attributes (generally after power-up), the reporting of fault or status information to the system, the configuration of the hub device(s) and/or memory subsystem(s) after power-up or during normal operation or other purposes. Depending on the bus characteristics, this bus might also provide a means by which the valid completion of operations could be reported by the hub devices and/or memory module(s) to the memory controller(s), or the identification of failures occurring during the execution of the main memory controller requests.

Performances similar to those obtained from point-to-point bus structures can be obtained by adding switch devices. These and other solutions offer increased memory packaging density at lower power, while retaining many of the characteristics of a point-to-point bus. Multi-drop busses provide an alternate solution, albeit often limited to a lower operating frequency, but at a cost/performance point that may be advantageous for many applications. Optical bus solutions permit significantly increased frequency and bandwidth potential, either in point-to-point or multi-drop applications, but may incur cost and space impacts.

As used herein the term "buffer" or "buffer device" refers to a temporary storage unit (as in a computer), especially one that accepts information at one rate and delivers it another. In exemplary embodiments, a buffer is an electronic device that provides compatibility between two signals (e.g., changing voltage levels or current capability). The term "hub" is sometimes used interchangeably with the term "buffer." A hub is a device containing multiple ports that is connected to several other devices. A port is a portion of an interface that serves a congruent I/O functionality (e.g., a port may be utilized for sending and receiving data, address, and control information over one of the point-to-point links, or busses). A hub may be a central device that connects several systems, subsystems, or networks together. A passive hub may simply forward messages, while an active hub, or repeater, amplifies and refreshes the stream of data which otherwise would deteriorate over a distance. The term hub device, as used herein, refers to a hub chip that includes logic (hardware and/or software) for performing memory functions.

Also as used herein, the term "bus" refers to one of the sets of conductors (e.g., wires, and printed circuit board traces or connections in an integrated circuit) connecting two or more functional units in a computer. The data bus, address bus and control signals, despite their names, constitute a single bus since each are often useless without the others. A bus may include a plurality of signal lines, each signal line having two or more connection points, that form a main transmission path that electrically connects two or more transceivers, transmitters and/or receivers. The term "bus" is contrasted with the term "channel" which is often used to describe the function of a "port" as related to a memory controller in a memory system, and which may include one or more busses or sets of busses. The term "channel" as used herein refers to a port on a memory controller. Note that this term is often used in conjunction with I/O or other peripheral equipment, however the term channel has been adopted by some to describe the interface between a processor or memory controller and one of one or more memory subsystem(s).

Further, as used herein, the term "daisy chain" refers to a bus wiring structure in which, for example, device A is wired to device B, device B is wired to device C, etc. The last device is typically wired to a resistor or terminator. All devices may receive identical signals or, in contrast to a simple bus, each device may modify one or more signals before passing them on. A "cascade" or cascade interconnect' as used herein refers to a succession of stages or units or a collection of interconnected networking devices, typically hubs, in which the hubs operate as a logical repeater, further permitting merging data to be concentrated into the existing data stream. Also as used herein, the term "point-to-point" bus and/or link refers to one or a plurality of signal lines that may each include one or more terminators. In a point-to-point bus and/or link, each signal line has two transceiver connection points, with each transceiver connection point coupled to transmitter circuitry, receiver circuitry or transceiver circuitry. A signal line refers to one or more electrical conductors or optical carriers, generally configured as a single carrier or as two or more carriers, in a twisted, parallel, or concentric arrangement, used to transport at least one logical signal.

Memory devices are generally defined as integrated circuits that are composed primarily of memory (storage) cells, such as DRAMs (Dynamic Random Access Memories), SRAMs (Static Random Access Memories), FeRAMs (Ferro-Electric RAMs), MRAMs (Magnetic Random Access Memories), Flash Memory and other forms of random access and related memories that store information in the form of electrical, optical, magnetic, biological or other means.

Dynamic memory device types may include asynchronous memory devices such as FPM DRAMs (Fast Page Mode Dynamic Random Access Memories), EDO (Extended Data Out) DRAMs, BEDO (Burst EDO) DRAMs, SDR (Single Data Rate) Synchronous DRAMs, DDR (Double Data Rate) Synchronous DRAMs or any of the expected follow-on devices such as DDR2, DDR3, DDR4 and related technologies such as Graphics RAMs, Video RAMs, LP RAM (Low Power DRAMs) which are often based on the fundamental functions, features and/or interfaces found on related DRAMs.

Memory devices may be utilized in the form of chips (die) and/or single or multi-chip packages of various types and configurations. In multi-chip packages, the memory devices may be packaged with other device types such as other memory devices, logic chips, analog devices and programmable devices, and may also include passive devices such as resistors, capacitors and inductors. These packages may include an integrated heat sink or other cooling enhancements, which may be further attached to the immediate carrier or another nearby carrier or heat removal system.

Module support devices (such as buffers, hubs, hub logic chips, registers, PLL's, DLL's, non-volatile memory, etc) may be comprised of multiple separate chips and/or components, may be combined as multiple separate chips onto one or more substrates, may be combined onto a single package or even integrated onto a single device—based on technology, power, space, cost and other tradeoffs. In addition, one or more of the various passive devices such as resistors, capacitors may be integrated into the support chip packages, or into the substrate, board or raw card itself, based on technology, power, space, cost and other tradeoffs. These packages may include an integrated heat sink or other cooling enhancements, which may be further attached to the immediate carrier or another nearby carrier or heat removal system.

Memory devices, hubs, buffers, registers, clock devices, passives and other memory support devices and/or components may be attached to the memory subsystem and/or hub device via various methods including solder interconnects, conductive adhesives, socket structures, pressure contacts and other methods which enable communication between the two or more devices via electrical, optical or alternate means.

The one or more memory modules (or memory subsystems) and/or hub devices may be electrically connected to the memory system, processor complex, computer system or other system environment via one or more methods such as soldered interconnects, connectors, pressure contacts, conductive adhesives, optical interconnects and other communication and power delivery methods. Connector systems may include mating connectors (male/female), conductive contacts and/or pins on one carrier mating with a male or female connector, optical connections, pressure contacts (often in conjunction with a retaining mechanism) and/or one or more of various other communication and power delivery methods. The interconnection(s) may be disposed along one or more edges of the memory assembly and/or placed a distance from all edge of the memory subsystem depending on such application requirements as ease-of-upgrade/repair, available space/volume, heat transfer, component size and shape and other related physical, electrical, optical, visual/physical access, etc. Electrical interconnections on a memory module are often referred to as contacts, or pins, or tabs. Electrical interconnections on a connector are often referred to as contacts or pins.

As used herein, the term memory subsystem refers to, but is not limited to: one or more memory devices; one or more memory devices and associated interface and/or timing/control circuitry; and/or one or more memory devices in conjunction with a memory buffer, hub device, and/or switch. The term memory subsystem may also refer to one or more memory devices, in addition to any associated interface and/or timing/control circuitry and/or a memory buffer, hub device or switch, assembled into a substrate, a card, a module or related assembly, which may also include a connector or similar means of electrically attaching the memory subsystem with other circuitry. The memory modules described herein may also be referred to as memory subsystems because they include one or more memory devices and hub devices Additional functions that may reside local to the memory subsystem and/or hub device include write and/or read buffers, one or more levels of memory cache, local pre-fetch logic, data encryption/decryption, compression/decompression, protocol translation, command prioritization logic, voltage and/or level translation, error detection and/or correction circuitry, data scrubbing, local power management circuitry and/or reporting, operational and/or status registers, initialization circuitry, performance monitoring and/or control, one or more co-processors, search engine(s) and other functions that may have previously resided in other memory subsystems. By placing a function local to the memory subsystem, added performance may be obtained as related to the specific function, often while making use of unused circuits within the subsystem.

Memory subsystem support device(s) may be directly attached to the same substrate or assembly onto which the memory device(s) are attached, or may be mounted to a separate interposer or substrate also produced using one or more of various plastic, silicon, ceramic or other materials which include electrical, optical or other communication paths to functionally interconnect the support device(s) to the memory device(s) and/or to other elements of the memory or computer system.

Information transfers (e.g. packets) along a bus, channel, link or other naming convention applied to an interconnection method may be completed using one or more of many signaling options. These signaling options may include such methods as single-ended, differential, optical or other approaches, with electrical signaling further including such methods as voltage or current signaling using either single or multi-level approaches. Signals may also be modulated using such methods as time or frequency, non-return to zero, phase shift keying, amplitude modulation and others. Voltage levels are expected to continue to decrease, with 1.5V, 1.2V, 1V and lower signal voltages expected consistent with (but often independent of) the reduced power supply voltages required for the operation of the associated integrated circuits themselves.

One or more clocking methods may be utilized within the memory subsystem and the memory system itself, including global clocking, source-synchronous clocking, encoded clocking or combinations of these and other methods. The clock signaling may be identical to that of the signal lines themselves, or may utilize one of the listed or alternate methods that is more conducive to the planned clock frequency (ies), and the number of clocks planned within the various subsystems. A single clock may be associated with all communication to and from the memory, as well as all clocked functions within the memory subsystem, or multiple clocks may be sourced using one or more methods such as those described earlier. When multiple clocks are used, the functions within the memory subsystem may be associated with a clock that is uniquely sourced to the subsystem, or may be based on a clock that is derived from the clock related to the information being transferred to and from the memory subsystem (such as that associated with an encoded clock). Alternately, a unique clock may be used for the information transferred to the memory subsystem, and a separate clock for information sourced from one (or more) of the memory subsystems. The clocks themselves may operate at the same or frequency multiple of the communication or functional frequency, and may be edge-aligned, center-aligned or placed in an alternate timing position relative to the data, command or address information.

Information passing to the memory subsystem(s) will generally be composed of address, command and data, as well as other signals generally associated with requesting or reporting status or error conditions, resetting the memory, completing memory or logic initialization and other functional, configuration or related information. Information passing from the memory subsystem(s) may include any or all of the information passing to the memory subsystem(s), however generally will not include address and command information. This information may be communicated using communication methods that may be consistent with normal memory device interface specifications (generally parallel in nature), the information may be encoded into a 'packet' structure, which may be consistent with future memory interfaces or simply developed to increase communication bandwidth and/or enable the subsystem to operate independently of the memory technology by converting the received information into the format required by the receiving device(s).

Initialization of the memory subsystem may be completed via one or more methods, based on the available interface busses, the desired initialization speed, available space, cost/complexity objectives, subsystem interconnect structures, the use of alternate processors (such as a service processor) which may be used for this and other purposes, etc. In one embodiment, the high speed bus may be used to complete the initialization of the memory subsystem(s), generally by first completing a training process to establish reliable communication, then by interrogation of the attribute or 'presence detect' data associated the various components and/or characteristics associated with that subsystem, and ultimately by programming the appropriate devices with information associated with the intended operation within that system. In a cascaded system, communication with the first memory subsystem would generally be established, followed by subsequent (downstream) subsystems in the sequence consistent with their position along the cascade interconnect bus.

A second initialization method would include one in which the high speed bus is operated at one frequency during the initialization process, then at a second (and generally higher) frequency during the normal operation. In this embodiment, it may be possible to initiate communication with all of the memory subsystems on the cascade interconnect bus prior to completing the interrogation and/or programming of each subsystem, due to the increased timing margins associated with the lower frequency operation.

A third initialization method might include operation of the cascade interconnect bus at the normal operational frequency (ies), while increasing the number of cycles associated with each address, command and/or data transfer. In one embodiment, a packet containing all or a portion of the address, command and/or data information might be transferred in one clock cycle during normal operation, but the same amount and/or type of information might be transferred over two, three or more cycles during initialization. This initialization process would therefore be using a form of 'slow' commands, rather than 'normal' commands, and this mode might be automatically entered at some point after power-up and/or re-start by each of the subsystems and the memory controller by way of POR (power-on-reset) logic included in each of these subsystems.

A fourth initialization method might utilize a distinct bus, such as a presence detect bus (such as the one defined in U.S. Pat. No. 5,513,135 to Dell et al., of common assignment herewith), an I2C bus (such as defined in published JEDEC standards such as the 168 Pin DIMM family in publication 21-C revision 7R8) and/or the SMBUS, which has been widely utilized and documented in computer systems using such memory modules. This bus might be connected to one or more modules within a memory system in a daisy chain/cascade interconnect, multi-drop or alternate structure, providing an independent means of interrogating memory subsystems, programming each of the one or more memory subsystems to operate within the overall system environment, and adjusting the operational characteristics at other times during the normal system operation based on performance, thermal, configuration or other changes desired or detected in the system environment.

Other methods for initialization can also be used, in conjunction with or independent of those listed. The use of a separate bus, such as described in the fourth embodiment above, also offers the advantage of providing an independent means for both initialization and uses other than initialization, such as described in U.S. Pat. No. 6,381,685 to Dell et al., of common assignment herewith, including changes to the subsystem operational characteristics on-the-fly and for the reporting of and response to operational subsystem information such as utilization, temperature data, failure information or other purposes.

With improvements in lithography, better process controls, the use of materials with lower resistance, increased field sizes and other semiconductor processing improvements, increased device circuit density (often in conjunction with increased die sizes) will help facilitate increased function on integrated devices as well as the integration of functions previously implemented on separate devices. This integration will serve to improve overall performance of the intended function, as well as promote increased storage density, reduced power, reduced space requirements, lower cost and other manufacturer and customer benefits. This integration is a natural evolutionary process, and may result in the need for structural changes to the fundamental building blocks associated with systems.

The integrity of the communication path, the data storage contents and all functional operations associated with each element of a memory system or subsystem call be assured, to a high degree, with the use of one or more fault detection and/or correction methods. Any or all of the various elements may include error detection and/or correction methods such as CRC (Cyclic Redundancy Code), EDC (Error Detection and Correction), parity or other encoding/decoding methods suited for this purpose. Further reliability enhancements may include operation re-try (to overcome intermittent faults such as those associated with the transfer of information), the use of one or more alternate or replacement communication paths to replace failing paths and/or lines, complement-re-complement techniques or alternate methods used in computer, communication and related systems.

The use of bus termination, on busses as simple as point-to-point links or as complex as multi-drop structures, is becoming more common consistent with increased performance demands. A wide variety of termination methods can be identified and/or considered, and include the use of such devices as resistors, capacitors, inductors or any combination thereof, with these devices connected between the signal line and a power supply voltage or ground, a termination voltage or another signal. The termination device(s) may be part of a passive or active termination structure, and may reside in one or more positions along one or more of the signal lines, and/or as part of the transmitter and/or receiving device(s). The terminator may be selected to match the impedance of the transmission line, or selected via an alternate approach to maximize the useable frequency, operating margins and related attributes within the cost, space, power and other constraints.

Technical effects and benefits of include the ability to use legacy DIMMs in a current generation memory system. In addition, the legacy, or prior generation, DIMMs can take advantage of serviceability improvements available to current generation DIMMs.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A memory adapter card comprising:
   two rows of contacts along a leading edge of a length of the card, the two rows of contacts adapted to be inserted into a socket that is connected to a daisy chain high-speed memory bus via a packetized multi-transfer interface;
   a socket installed on the trailing edge of the card; and
   a hub device for converting the packetized multi-transfer interface into a parallel interface having timings and interface levels that are operable with a legacy high reliability memory module having a parallel interface that is inserted into the socket, and for calculating error correction code (ECC) check bits for address and command information to be transmitted to the legacy high reliability memory module and retaining ECC information included in the data being transferred to and from the legacy module via the daisy chain high-speed memory bus;
   thereby retaining the interface and data error detection and reliability of both the daisy chain memory interface and the legacy memory module.

2. The memory adapter card of claim 1, wherein a bus utilized by the parallel interface operates at a slower speed than the memory bus.

3. The memory adapter card of claim 1, wherein a bus utilized by the memory module is wider than the memory bus.

4. The memory adapter card of claim 1, wherein the adapter card has 276 contacts along the leading edge of the card.

5. The memory adapter card of claim 1, wherein the memory module has 276 contacts.

6. The memory adapter card of claim 1, wherein the leading edge of the card is between 149 and 153 millimeters (mm).

7. The memory adapter card of claim 1, wherein the leading edge includes a positioning key located in a non-center position with respect to the length of the card.

8. The memory adapter card of claim 1, wherein the contacts include a plurality of redundant contacts, wherein a given redundant contact with respect to a given primary function contact is located directly behind said primary function contact.

9. A daisy chain high-speed memory subsystem comprising:
   a memory adapter card comprising two rows of contacts along a leading edge of a length of the card, the two rows of contacts adapted to be inserted into a socket that is connected to a daisy chain high-speed memory bus via a packetized multi-transfer interface;
   a socket installed on the trailing edge of the card; adapted for the insertion of a legacy high reliability memory module; and
   a hub device for converting the packetized multi-transfer interface into a parallel interface having timings and interface levels that are operable with a legacy high reliability memory module having a parallel interface that is inserted into the socket, and for calculating ECC check bits for address and command information to be transmitted to the legacy high reliability memory module inserted into the socket on the trailing edge of the memory adapter;
   whereby the memory module and the memory adapter card operate as a dynamic memory storage medium on the memory bus including ECC on the daisy chain packetized memory interface, ECC on data received by and transferred from the legacy memory module, and ECC on address and command information transmitted between the hub device and the legacy high reliability memory module, thereby enabling error detection and correction capabilities of both the daisy chain memory subsystem and the legacy memory module.

10. The memory subsystem of claim 9, wherein a bus utilized by the parallel interface operates at a slower speed than the memory bus.

11. The memory subsystem of claim 9, wherein a bus utilized by the memory module is wider than the memory bus.

12. The memory subsystem of claim 9, wherein the adapter card has 276 contacts along the leading edge of the card.

13. The memory subsystem of claim 9, wherein the memory module has 276 contacts.

14. The memory subsystem of claim 9, wherein the leading edge of the card is between 149 and 153 (mm).

15. The memory subsystem of claim 9, wherein the leading edge of the adapter card includes a positioning key located in a non-center position with respect to the length of the card.

16. The memory subsystem of claim 9, wherein the contacts include a plurality of redundant contacts, wherein a given redundant contact with respect to a given primary function contact is located directly behind said primary function contact.

17. The memory subsystem of claim 9, wherein the hub device generates check bits across the address and commands sent to the memory module.

18. The memory subsystem of claim 17, wherein the memory subsystem continues to operate in the event of a failure affecting one of the address or command signals between the hub device and the memory module.

19. A method for providing an adapter to allow the re-use of a legacy high reliability parallel interface memory module in a system having a high reliability packetized multi-transfer interface operating at a higher speed than the parallel interface, the method comprising:

electrically connecting the legacy parallel interface high reliability memory module to a hub device located on an adapter operable as a bus converter to convert a packetized multi-transfer interface bus to a programmable parallel interface bus which provides one or more of address, command, data and clock signals in a manner that is compatible with the parallel interface module;

calculating error correction code (ECC) check bits in the hub device for address and command information to be transmitted to the legacy high reliability memory module;

transferring the address, command, and ECC check bits from the adapter card to the legacy high reliability memory module using the parallel interface; and receiving the address, command and ECC check bits by a buffer device contained in the legacy memory module, the buffer device correcting any single bit errors present in the received address, command and ECC check bit information from the adapter card, thereby minimizing the risk of failure due to poor electrical contact between the adapter card and the legacy high reliability memory module;

thereby enabling operation of the legacy memory module while maintaining the interface reliability included in the packetized multi-transfer memory interface, retaining ECC information included in the data being transferred to and from the legacy module and maintaining the address and command interface reliability of the legacy high reliability module.

20. The method of claim 19, wherein the hub device is packaged on an adapter card.

* * * * *